US011971165B2

(12) United States Patent
Deng et al.

(10) Patent No.: US 11,971,165 B2
(45) Date of Patent: Apr. 30, 2024

(54) LIGHT REFLECTION ASSEMBLY, REFLECTIVE LIGHT SOURCE DEVICE, AND LAMP

(71) Applicant: Min Deng, Shanghai (CN)

(72) Inventors: Min Deng, Shanghai (CN); Niels Jacob Woelders, Shanghai (CN)

(73) Assignee: Min Deng, Shanghai (CN)

( * ) Notice: Subject to any disclaimer, the term of this patent is extended or adjusted under 35 U.S.C. 154(b) by 0 days.

(21) Appl. No.: 18/043,147

(22) PCT Filed: Aug. 5, 2021

(86) PCT No.: PCT/CN2021/110704
§ 371 (c)(1),
(2) Date: Feb. 27, 2023

(87) PCT Pub. No.: WO2022/042249
PCT Pub. Date: Mar. 3, 2022

(65) Prior Publication Data

US 2023/0313970 A1 Oct. 5, 2023

(30) Foreign Application Priority Data

Aug. 27, 2020 (CN) ......................... 202010879653.7
Aug. 27, 2020 (CN) ......................... 202021827489.7

(51) Int. Cl.
*F21V 7/00* (2006.01)
*F21K 9/68* (2016.01)
(Continued)

(52) U.S. Cl.
CPC .............. *F21V 7/0033* (2013.01); *F21K 9/68* (2016.08); *F21V 23/005* (2013.01); *F21Y 2113/20* (2016.08)

(58) Field of Classification Search
CPC .... F21V 7/0008; F21V 7/0025; F21V 7/0033; F21V 7/0041; F21V 7/048; F21V 7/16; F21V 13/06; F21V 14/04; F21W 211/02
See application file for complete search history.

(56) References Cited

U.S. PATENT DOCUMENTS 5,029,051 A 7/1991 Shirai et al.
7,175,312 B2 * 2/2007 Fowler, Jr. .............. F21V 14/04
362/282

(Continued)

FOREIGN PATENT DOCUMENTS

CN 201228915 Y 4/2009
CN 101769501 A 7/2010

(Continued)

OTHER PUBLICATIONS

International Search Report and Written Opinion for Application No. PCT/CN2021/110704, dated Nov. 3, 2021, 4 Pages (including English Translation).

(Continued)

*Primary Examiner* — Matthew J. Peerce
(74) *Attorney, Agent, or Firm* — Brooks Kushman P.C.

(57) ABSTRACT

A light reflection assembly, a reflective light source device, and a lamp. The light reflection assembly includes first, second, third, and fourth side walls that enclose a reflection cavity having first and second openings at opposite ends. The first opening is within a first reference plane, and a first reference straight line perpendicularly intersects, at a first intersection within the first opening, the first reference plane. An included angle between a first straight line section that connects first and second end points and a portion of the first reference plane that overlaps the first opening is a first included angle, and an included angle between a second straight line section that connects third and a fourth end points and a portion of the first reference plane that overlaps (Continued)

the first opening is a second included angle, the first included angle being smaller than the second included angle.

18 Claims, 9 Drawing Sheets

(51) Int. Cl.
*F21V 23/00* (2015.01)
*F21Y 113/20* (2016.01)

(56) References Cited

U.S. PATENT DOCUMENTS

| | | | | |
|---|---|---|---|---|
| 8,113,680 | B2 * | 2/2012 | O'Brien | F21S 8/043 362/147 |
| 8,220,962 | B2 * | 7/2012 | Cheng | F21V 7/0083 362/240 |
| 8,388,192 | B2 * | 3/2013 | Guercio | F21V 14/04 362/306 |
| 2010/0027274 | A1 * | 2/2010 | Liu | F21V 7/09 362/346 |
| 2010/0165641 | A1 | 7/2010 | Cheng | |
| 2013/0294063 | A1 | 11/2013 | Lou et al. | |

FOREIGN PATENT DOCUMENTS

| | | | |
|---|---|---|---|
| CN | 109681817 | A | 4/2019 |
| CN | 212273922 | U | 1/2021 |
| KR | 100986736 | B1 | 10/2010 |
| KR | 101531462 | B1 | 6/2015 |
| KR | 102128220 | B1 | 6/2020 |

OTHER PUBLICATIONS

Extended European Search Report for Application No. 21860089.8—1201 / 4187147 PCT/CN2021/110704, dated Dec. 13, 2023, 11 Pages.

* cited by examiner

LIGHT REFLECTION ASSEMBLY, REFLECTIVE LIGHT SOURCE DEVICE, AND LAMP

CROSS-REFERENCE TO RELATED APPLICATIONS

This application is the U.S. national phase of PCT Application No. PCT/CN2021/110704 filed on Aug. 5, 2021, which claims priority to Chinese Patent Application No. 202010879653.7 filed on Aug. 27, 2020, and to Chinese Patent Application No. 202021827489.7 filed on Aug. 27, 2020, which are hereby incorporated herein by reference in their entireties.

TECHNICAL FIELD

The embodiments of the present disclosure relate to a light reflection assembly, a reflective light source device and a lamp.

BACKGROUND

Floodlights are widely used in various indoor and outdoor lighting fields such as highway tunnel lighting, airport and harbor lighting, municipal engineering lighting, urban landscape lighting, outdoor advertising lighting, stadium lighting, factory and warehouse lighting, etc. Because these applications require light to be evenly distributed in a wide area, and redundant and unnecessary dazzling interference light should be avoided as much as possible, the uniformity of light distribution and anti-glare performance become the main criteria for judging the quality of floodlights. Besides, the convenience of debugging, the ease of installation, and the light efficiency of floodlights are also the problems to be solved in the application of floodlights.

SUMMARY

The embodiments of the present disclosure provide a light reflection assembly, including: a sidewall portion. The sidewall portion includes a first sidewall, a second sidewall, a third sidewall, and a fourth sidewall, the first sidewall and the second sidewall are opposite to each other, the third sidewall and the fourth sidewall are opposite to each other, and a reflective chamber is delimited by the first sidewall, the second sidewall, the third sidewall, and the fourth sidewall, and the reflective chamber has a first opening and a second opening at opposite ends. The first opening is in a first reference plane, and a first reference straight line is perpendicularly intersected with the first reference plane at a first intersection point in the first opening. On a first cross section of the light reflection assembly, which is coplanar with the first reference straight line and is intersected with the first sidewall and the second sidewall, an inner surface of the first sidewall facing the reflective chamber has a first end point on the first reference plane and a second end point opposite to the first end point, and an inner surface of the second sidewall facing the reflective chamber has a third end point on the first reference plane and a fourth end point opposite to the third end point. An included angle between a first straight line segment connecting the first end point and the second end point and a part of the first reference plane overlapping with the first opening is a first included angle, an included angle between a second straight line segment connecting the third end point and the fourth end point and the part of the first reference plane overlapping with the first opening is a second included angle, and the first included angle is smaller than the second included angle.

In an exemplary embodiment, the first included angle is in a range from 30 degrees to 120 degrees.

In an exemplary embodiment, a difference between the second included angle and the first included angle is greater than or equal to 20 degrees.

In an exemplary embodiment, the first sidewall is intersected with the first reference straight line.

In an exemplary embodiment, on a second cross section of the light reflection assembly, which is coplanar with the first reference straight line and is intersected with the third sidewall and the fourth sidewall, an inner surface of the third sidewall facing the reflective chamber has a fifth end point on the first reference plane and a sixth end point opposite to the fifth end point, and an inner surface of the fourth sidewall facing the reflective chamber has a seventh end point on the first reference plane and an eighth end point opposite to the seventh end point. An included angle between a third straight line segment connecting the fifth end point and the sixth end point and the part of the first reference plane overlapping with the first opening is a third included angle, and an included angle between a fourth straight line segment connecting the seventh end point and the eighth end point and the part of the first reference plane overlapping with the first opening is a fourth included angle. At least one selected from the group consisting of the first included angle, the second included angle, the third included angle, and the fourth included angle is adjustable.

In an exemplary embodiment, at least a part of the inner surface of at least one of the first sidewall and the second sidewall is a concave curved surface protruding away from the reflective chamber.

In an exemplary embodiment, the concave curved surface is a smooth curved surface.

In an exemplary embodiment, on a second cross section of the light reflection assembly, which is coplanar with the first reference straight line and is intersected with the third sidewall and the fourth sidewall, an inner surface of the third sidewall facing the reflective chamber has a fifth end point on the first reference plane and a sixth end point opposite to the fifth end point, and an inner surface of the fourth sidewall facing the reflective chamber has a seventh end point on the first reference plane and an eighth end point opposite to the seventh end point. On the second cross section, the fifth end point is closer to the first reference straight line than the sixth end point, and the seventh end point is closer to the first reference straight line than the eighth end point.

In an exemplary embodiment, the inner surface of at least one selected from the group consisting of the first sidewall, the second sidewall, the third sidewall, and the fourth sidewall is a smooth surface as a whole.

In an exemplary embodiment, a part of the inner surface of the second sidewall adjacent to the third sidewall and a part of the inner surface of the third sidewall adjacent to the second sidewall are both located in a first smooth curved surface; and/or a part of the inner surface of the second sidewall adjacent to the fourth sidewall and a part of the inner surface of the fourth sidewall adjacent to the second sidewall are both located in a second smooth curved surface.

In an exemplary embodiment, the inner surface of the second sidewall has at least one convex portion protruding toward the reflective chamber.

In an exemplary embodiment, on the first cross section, at least a part of the convex portion is located at a side of the second straight line segment facing the first sidewall.

In an exemplary embodiment, the light reflection assembly further includes a light-transmitting plate adjacent to the second opening and covering the second opening.

In an exemplary embodiment, at least a part of an outer surface, away from the reflective chamber, of at least one selected from the group consisting of the first sidewall, the second sidewall, the third sidewall, and the fourth sidewall, is planar.

In an exemplary embodiment, a length of the first straight line segment is less than a length of the second straight line segment.

Another embodiment of the present disclosure provides a reflective light source device, including: at least one light reflection assembly as described above; and at least one light source assembly combined with the at least one light reflection assembly, the light source assembly includes an effective light-emitting portion. A light-emitting centerline direction of the light source assembly is same as an extending direction of the first reference straight line, and the first reference straight line is intersected with the effective light-emitting portion of the light source assembly.

In an exemplary embodiment, the light source assembly includes a circuit board and at least one light-emitting element mounted on the circuit board, and the at least one light reflection assembly is combined with the circuit board so that the at least one light-emitting element is located in the reflective chamber of the at least one light reflection assembly in one-to-one correspondence.

In an exemplary embodiment, on the first cross section, the second end point of the first sidewall overlaps with an edge part of the effective light-emitting portion closest to the first end point in an extending direction of the first reference straight line in a case where a straight line segment connecting the second end point of the first sidewall and the fourth end point of the second sidewall is parallel to the first reference plane.

In an exemplary embodiment, light emitted from the light source assembly forms an illumination region on a second reference plane after passing through the reflective chamber, the second reference plane is located at a side of the at least one light reflection assembly opposite to the light source assembly, and the illumination region has at least one pair of edges parallel to each other.

In an exemplary embodiment, the illumination region is substantially rectangular or square in shape.

In an exemplary embodiment, on the first cross section, the first sidewall is configured to reflect a first light beam from a light-emitting point of the light source assembly into a second light beam, and the second light beam is intersected with a reference line at an outer side of the reflective chamber, and the reference line is a straight line passing through the light-emitting point and the fourth end point of the second sidewall.

In an exemplary embodiment, the first sidewall of the at least one light reflection assembly and the effective light-emitting portion of the light source assembly are configured to be rotatable relative to each other.

In an exemplary embodiment, the effective light-emitting portion of the light source assembly has a strip shape.

Another embodiment of the present disclosure provides a lamp, including: at least one reflective light source device as described above; and a lampshade body, provided with at least one mounting portion to mount the at least one reflective light source device in one-to-one correspondence.

In an exemplary embodiment, each light source mounting portion is configured to mount corresponding reflective light source devices in at least two different orientations.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

Figure 1:
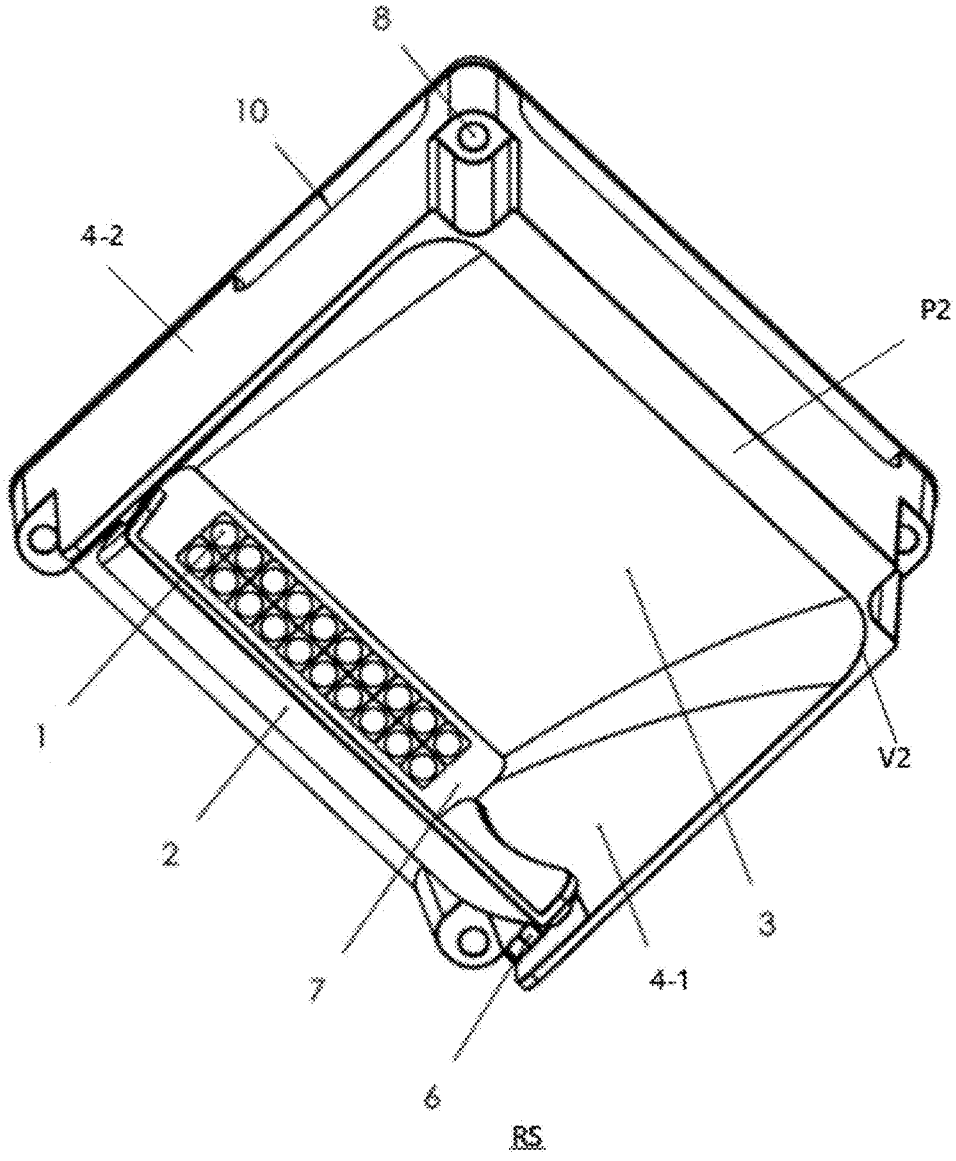
FIG. 1 is a structural perspective view of a reflective light source device provided by an embodiment of the present disclosure as viewed from below.

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the described object is changed, the relative position relationship may be changed accordingly. The phrase "plurality of" refers to two or more, unless otherwise explicitly defined. The term "connect" is not limited to the case of direct connection, but also includes the case of indirect connection through intermediate members, unless otherwise explicitly defined. Similar or identical reference numerals indicate similar or identical elements/objects throughout the text.

In the present disclosure, two linear elements being "parallel to each other" is not limited to the case that the two linear/planar elements must be strictly parallel to each other, and it is allowed that there exists a certain deviation of the parallel degree of the two linear/planar elements. For example, the included angle between two linear/planar elements parallel to each other is less than 2 degrees. In the present disclosure, two linear elements being "perpendicular to each other" is not limited to the case that the included angle between the two linear/planar elements is strictly equal to 90 degrees, and it is allowed that there exists a certain deviation of the perpendicular degree of the two linear/planar elements. For example, the included angle between two linear elements perpendicular to each other can be in the range of 88 degrees to 92 degrees.

At present, floodlights in the market generally have the following problems.

1. At present, commercial floodlights generally have uneven light distribution. The illuminated region is bright in the center, dark around the center, bright at a position close to the light source, and dark at a position away from the light source; and the illuminated range is small, and the light beam range is round, oval or irregular in shape. Due to the uneven light distribution of floodlights, in order to make the whole region needing illumination meet the lighting requirements, it is necessary to conduct accurate pre-simulation and installation site direction debugging in the case where multiple lamps are combined for illumination. The number of lamps even needs to be increased, so that all points in the illuminated region can meet the lighting requirements. The procedures are cumbersome, time-consuming, and labor-intensive; the cost increases; and the light intensity of the illuminated region is uneven, which seriously affects the lighting effect.

2. At present, there is a common and serious problem of light overflow in commercial floodlights. In addition to the region that needs to be illuminated, the unwanted or overflowing light is irradiated to the periphery, which may cause light pollution to the surrounding houses; and if light is irradiated into the sky above, it will lead to a glow. The glow is a kind of light pollution, which will disrupt the night sky and may damage the health of human beings and animals. And when the light does not reach the predetermined target, energy will be wasted.

3. At present, most commercial floodlights are installed at high places, and the light source is designed to directly face the illuminated region. In the illuminated region, the light source is directly visible to the naked eyes. The glare caused by this design will not only cause visual discomfort, but also lead to visual interference when the glare is strong. In some cases, this visual interference may cause serious consequences. For example, the glare originated from street lamps may cause drivers to be unable to see the road ahead, thus causing accidents; the glare originated from the light on the football field may cause players to lose because they can't see the position of the football clearly.

4. At present, the commercial floodlights have only a fixed luminous angle, which depends on the design of the reflective cup, reflective shade or lens. Different application scenarios require different luminous angles, so if lamp manufacturers and distributors want to shorten the delivery time, they must prepare the product inventory in advance for different luminous angles. Due to the various requirements of luminous angles, the product inventory will take up a considerable amount of funds. The light source is upgraded quickly, and if the prepared inventory cannot be sold in time, it may become obsolete products. However, for the products with uncommon luminous angles that are not stocked, it is often difficult for lamp manufacturers to produce or order reflective cups, reflective shades or lenses due to the small quantity.

5. At present, the commercial floodlights are inconvenient to install. Floodlights are mostly installed on high places or lampposts, and working high above the ground is required during installation. During on-site debugging, due to the uneven light distribution, single angle and single direction of commercial floodlights, the installation personnel needs to debug the hanging direction and angle of floodlights on the installation bracket high above the ground for many times, and some directions may not be illuminated due to the limitation of the lamppost position and the installation bracket. In order to meet the lighting requirements, a new lamppost must be added or the direction of the installation bracket must be adjusted, which greatly increases the work quantity.

6. At present, the commercial floodlights with reflective cups or reflective shades generally have low light efficiency.

Embodiments of the present disclosure provide a light reflection assembly, a reflective light source device and a lamp, which make the lamp have a larger illumination range, higher light efficiency, and more uniform light distribution, and have the light beam range larger than that of a traditional floodlight, and have a shape with uniform brightness (e.g., rectangular shape), so that when multiple lamps are spliced for a large-area illumination, both low-brightness gaps and overlapping high-brightness regions are prevented. The light reflection assembly, the reflective light source device, and the lamp provided by the embodiments of the present disclosure also cut off the useless light overflow, improve the energy efficiency, and prevent harmful glare; the luminous angle can be adjusted in advance or at the installation site, the installation will not be restricted by the lamppost and the bracket, and 360-degree illumination without dead angle can be realized by multi-direction and multi-angle combination, so that the floodlight installation becomes flexible and simple.

Figure 2:
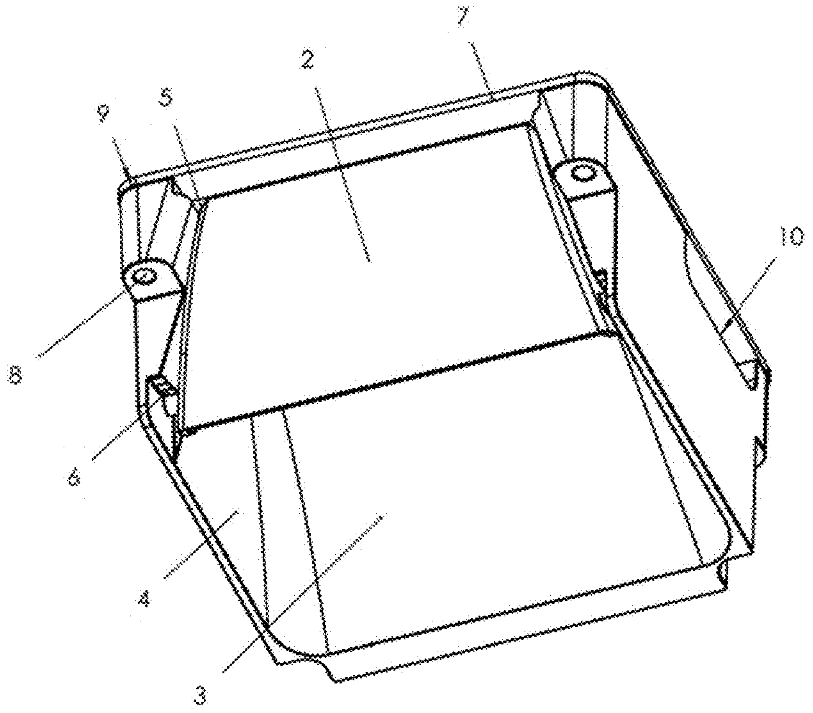
FIG. 2 is a structural perspective view of a reflective light source device provided by an embodiment of the present disclosure as viewed from lower rear.
Figure 3:
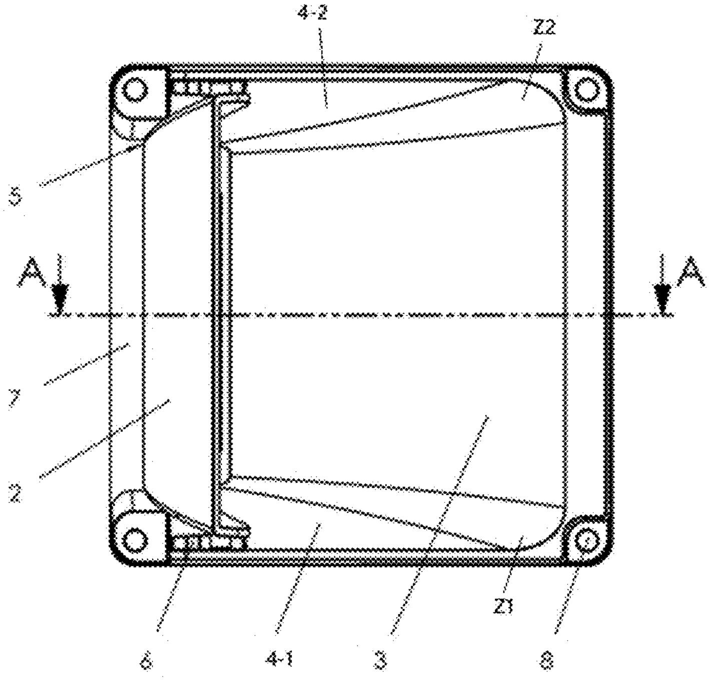
FIG. 3 is a schematic structural plan view of a reflective light source device provided by an embodiment of the present disclosure as viewed from bottom to top.
Figure 4:
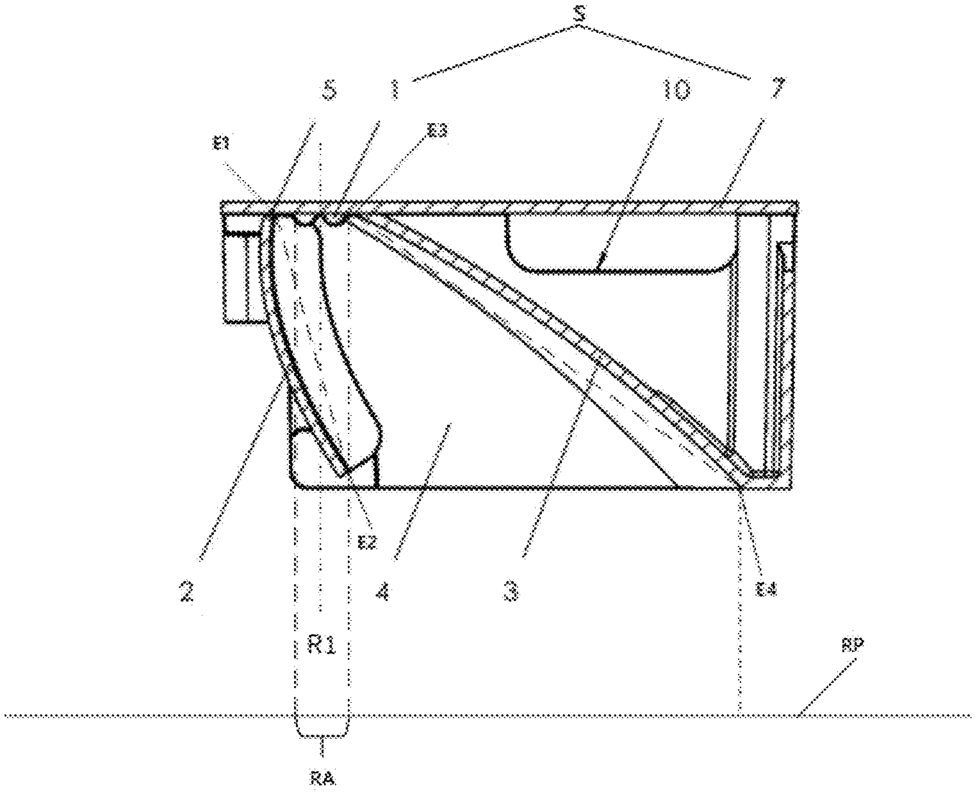
FIG. 4 is a schematic structural view of the reflective light source device provided by the embodiment of the present disclosure on a first cross section taken along the dashed line AA illustrated in FIG. 3.
Figure 5:
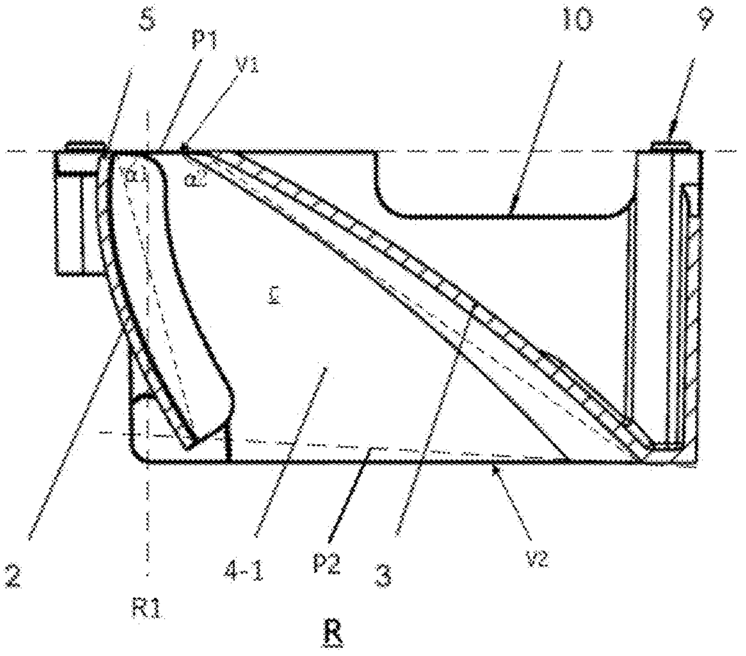
FIG. 5 is a schematic structural view of a light reflection assembly included in a reflective light source device provided by an embodiment of the present disclosure on a first cross section.

FIG. 1 and FIG. 2 are structural perspective views of a reflective light source device provided by an embodiment of the present disclosure as viewed from bottom to top; FIG. 3 is a schematic structural plan view of a reflective light source device provided by an embodiment of the present disclosure as viewed from bottom to top; FIG. 4 is a schematic structural cross-sectional view of the reflective light source device provided by the embodiment of the present disclosure taken along the dashed line AA illustrated in FIG. 3; FIG. 5 is a schematic structural view of a light reflection assembly in the reflective light source device provided by the embodiment of the present disclosure on a first cross section corresponding to the dashed line AA.

Referring to FIG. 1 to FIG. 5, a reflective light source device RS provided by an embodiment of the present disclosure includes a light source assembly S and a light reflection assembly R that are combined with each other.

The light reflection assembly R includes a first sidewall (rear sidewall) 2, a second sidewall (front sidewall) 3, a third sidewall (left sidewall) 4-1, and a fourth sidewall (right sidewall) 4-2. The first sidewall 2 and the second sidewall 3 are opposite to each other, and the third sidewall 4-1 and the fourth sidewall 4-2 are opposite to each other. A reflective chamber C is delimited by the first sidewall 2, the second sidewall 3, the third sidewall 4-1, and the fourth sidewall 4-2. Two adjacent sidewalls of the first sidewall 2, the second sidewall 3, the third sidewall 4-1, and the fourth sidewall 4-2 can be directly connected or connected via other intermediate members. For example, each of the first sidewall 2, the second sidewall 3, the third sidewall 4-1, and the fourth sidewall 4-2 is continuous.

In the present embodiment, the second sidewall 3, the third sidewall 4-1, and the fourth sidewall 4-2 are formed as an integral structure, and the first sidewall 2 can be rotatably connected to the integral structure. The embodiment of the present disclosure is not limited to this case. In another exemplary embodiment, one part of the first sidewall 2 can be formed as an integral structure with the second sidewall 3, the third sidewall 4-1, and the fourth sidewall 4-2, and the other part of the first sidewall 2 is rotatably connected to the integral structure. In further another exemplary embodiment, at least a part of at least one of the first sidewall 2, the second sidewall 3, the third sidewall 4-1, and the fourth sidewall 4-2 is rotatably connected to at least another one of the first sidewall 2, the second sidewall 3, the third sidewall 4-1, and the fourth sidewall 4-2. In still another exemplary embodiment, the first sidewall 2, the second sidewall 3, the third sidewall 4-1, and the fourth sidewall 4-2 are integrally formed and cannot rotate relative to each other.

The reflective chamber C has a first opening V1 at an upper end and a second opening V2 at a lower end. The first opening V1 at the upper end and the second opening V2 at the lower end of the reflective chamber C are communicated with the exterior. The first opening V1 is defined, for example, by the upper end edges of the inner surfaces, facing the reflective chamber C, of the first sidewall 2, the second sidewall 3, the third sidewall 4-1, and the fourth sidewall 4-2; and the second opening V2 is defined, for example, by the lower end edges of the inner surfaces, facing the reflective chamber C, of the first sidewall 2, the second sidewall 3, the third sidewall 4-1, and the fourth sidewall 4-2.

In the present embodiment, the first opening V1 is, for example, located in the reference plane P1 (i.e., an example of the first reference plane); that is, at least a part of the upper end edge of the inner surface of each of the first sidewall 2, the second sidewall 3, the third sidewall 4-1, and the fourth sidewall 4-2 defining the first opening V1 is located in the reference plane P1. The second opening V2 is, for example, located in the reference plane P2 (i.e., an example of the second reference plane); that is, at least a part of the lower end edge of the inner surface of each of the first sidewall 2, the second sidewall 3, the third sidewall 4-1, and the fourth sidewall 4-2 defining the second opening V2 is located in the reference plane P2. In the present embodiment, for example, the reflective chamber C is configured to reflect the light emitted from the light-emitting element 1 and entering the interior of the reflective chamber C to the exterior of the reflective chamber C through the second opening V2. Here, the interior and exterior of the reflective chamber C are bounded by the reference planes P1 and P2. Specifically, the space between the reference planes P1 and P2 in the reflective chamber C is the interior of the reflective chamber C, and the space other than the interior is the exterior of the reflective chamber C. In the present embodiment, the first sidewall 2 is rotatable, so the position of the reference plane P2 changes with the position change of the first sidewall 2. Here, the reference planes P1 and P2 are both virtual planes, which are used to describe and define the positional relationship between related structures and spaces.

In the present embodiment, the light source assembly S includes a circuit board 7 and a light-emitting element 1 mounted on the circuit board 7. An upper end surface of the light reflection assembly R is, for example, located in the reference plane P1, and the upper end surface is configured to carry the circuit board 7, so that the circuit board 7 is supported by and located on the upper end surface of the light reflection assembly R when the light source assembly S and the light reflection assembly R are combined together. For example, after the light source assembly S is mounted on the top of the light reflection assembly R, at least a part of the light-emitting element 1 is located in the reflective chamber C and can emit light toward the reflective chamber C.

The light source assembly S has, for example, a light-emitting centerline direction. The light-emitting centerline direction of the light source assembly S is the light-emitting centerline direction of the light-emitting element 1, such as the downward direction of the straight line R1 as illustrated in FIG. 4 and FIG. 5. The intensity of light emitted from the light-emitting element 1 in the light-emitting centerline direction is basically the maximum value. For example, on the first cross section, the light-emitting centerline direction is also located at the substantial center position of all light beams emitted from the light source assembly S. In the embodiment of the present disclosure, the light-emitting element 1 is a light-emitting diode (LED) element, and the light-emitting centerline direction of the light source assembly S is, for example, the light-emitting normal direction of the light-emitting element 1. This direction is, for example, perpendicular to the effective light-emitting portion of the light-emitting layer of the LED element 1. For example, in the embodiment as illustrated in FIG. 1 to FIG. 5, the light-emitting centerline direction is substantially perpendicular to the circuit board 7 and the reference plane P1. Here, the type of the light source assembly S is not limited.

A first reference straight line R1 is perpendicularly intersected with the reference plane P1 at a first intersection point in the first opening V1. Here, the first reference straight line R1 is a virtual straight line, which is used to describe the position and size relationship of related components. The first reference straight line R1 can extend infinitely in two opposite extending directions. An extending direction of the first reference straight line R1 is the same as the light-emitting centerline direction. For example, the first reference straight line R1 is intersected with the effective light-emitting portion of the light source assembly S. Here, the position where the first reference straight line R1 is intersected with the effective light-emitting portion of the light source assembly S is not limited. In an exemplary embodiment, the first reference straight line R1 is intersected with the center of the effective light-emitting portion of the light source assembly S. In another exemplary embodiment, the first reference straight line R1 is intersected with the edge of the effective light-emitting portion of the light source assembly S.

In an exemplary embodiment, the first reference straight line R1 is intersected with the effective light-emitting portion of the light source assembly S, and is intersected with the rear sidewall 2. That is, in the extending direction of the first reference straight line R1, the rear sidewall 2 at least partially overlaps with the effective light-emitting portion of the light source assembly S.

For example, the first sidewall 2 is the rear sidewall 2 located at the rear side of the LED element 1. For example, the inner surface of the first sidewall 2 facing the reflective chamber C is a first concave curved surface protruding away from the reflective chamber C. The first concave curved surface is, for example, a rear light reflective surface. For example, the first concave curved surface is a smooth curved surface or a curved surface composed of multiple planar surfaces. However, the embodiments of the present disclosure are not limited to these cases. In another exemplary embodiment, the inner surface, facing the reflective chamber C, of the rear sidewall 2 located at the rear side of the LED element 1 can be a planar surface as a whole, or a part thereof can be a planar surface and the other part thereof can be a curved surface.

The rear sidewall 2 is rotatable, and the rear light reflective surface can, for example, extend downward to just below the LED element 1, so as to cut off at least part of glare emitted directly downward and backward downward from the LED element 1, and reflect the light, emitted directly downward and backward downward from the LED element 1 to the rear light reflective surface, to the front, thereby improving the illumination uniformity of the illumination region.

For example, the second sidewall 3 is the front sidewall 3 located at the front side of the LED element 1. For example, the inner surface of the second sidewall 3 facing the reflective chamber C is a second concave curved surface protruding away from the reflective chamber C. For example, the second concave curved surface is a smooth curved surface or a curved surface composed of multiple planar surfaces. For example, the second concave curved surface is configured to cut off glare emitted forward from the light source. The second concave curved surface is, for example, a front light blocking surface or a front light reflective surface. However, the embodiments of the present disclosure are not limited to these cases. In another exemplary embodiment, at least one of the first concave curved surface and the second concave curved surface is a smooth curved surface; in further another exemplary embodiment, the inner surface, facing the reflective chamber C, of at least one of the rear sidewall 2 and the front sidewall 3 can be a planar surface as a whole, or a part thereof can be a planar surface and the other part thereof can be a curved surface.

For example, the first concave curved surface and the second concave curved surface are different in shape and are different in size. Referring to FIG. 3 and FIG. 4, on the first cross section along the dashed line AA, the included angle between the first concave curved surface and the light-emitting centerline direction of the LED element 1 is also different from the included angle between the second concave curved surface and the light-emitting centerline direction of the LED element 1.

The third sidewall 4-1 and the fourth sidewall 4-2 are, for example, a left sidewall 4-1 and a right sidewall 4-2, respectively, which are placed on the left and right sides of the LED element 1 to cut off glare emitted leftward and rightward from the LED element 1. The inner surfaces, facing the reflective chamber C, of the left sidewall 4-1 and the right sidewall 4-2 are, for example, a planar surface or a smooth curved surface as a whole, or a curved surface composed of multiple planar surfaces. The inner surfaces, facing the reflective chamber C, of the left sidewall 4-1 and the right sidewall 4-2 are a left light reflective surface and a right light reflective surface, respectively; and for example, light beams incident on the left light reflective surface and the right light reflective surface from the LED element 1 are reflected to the lateral front. Therefore, the light exiting direction of the reflective light source device RS provided by the embodiment of the present disclosure can be different from the directly facing direction of the LED element 1.

For example, the included angle between each light blocking surface or light reflective surface and the light exiting direction of the light source can be elaborately designed. For example, the front light blocking surface or the front light reflective surface does not block the light directly emitted from the LED element 1 to the illumination region, or the light reflected by the rear light reflective surface or the left and right light reflective surfaces to the illumination region as much as possible, so as to improve the light efficiency.

In the embodiment of the present disclosure, it can be designed that the reflection angle and the reflection path of the light beams emitted from the light source are adjustable by the rear light reflective surface and/or the left and right light reflective surfaces and/or the front light blocking surface or the front light reflective surface, so as to adjust the light-emitting angle of the reflective light source device, which is realized by adjusting the included angle between the rear light reflective surface and/or the left and right light reflective surfaces and/or the front light blocking surface or the front light reflective surface and the light-emitting centerline direction of the light source. For example, it can be designed that the included angle between the rear light reflective surface and the light-emitting centerline direction of the light source is adjustable, or the included angles between the left and right light reflective surfaces and the light-emitting centerline direction of the light source are adjustable, or the included angle between the front light blocking surface or the front light reflective surface and the light-emitting centerline direction of the light source is adjustable; or it can also be designed that the included angles between any two or more of the rear light reflective surface, the left and right light reflective surfaces, the front light blocking surface or the front light reflective surface and the light-emitting centerline direction of the light source are independently adjustable. In the present embodiment, the design that the included angle between the rear light reflective surface and the light-emitting centerline direction is adjustable is selected for illustration.

At present, the light sources used for floodlighting in the market are basically energy-saving light-emitting diode (LED), and the light-emitting angle of LED is mostly between 100 degrees and 160 degrees. If the included angle between the front light blocking surface and the light-emitting normal direction of the LED is large enough, it will not block most of the light emitted from the LED to the illumination region, but will only cut off the light that overflows in the front horizontal direction and the upper front direction, which account for about 3% of the total luminous flux. However, if a reflective material is applied to the front light blocking surface to form a front light reflective surface, the received light can be reflected to the lower front so as to reach the region to be illuminated, thus reducing the absorption of the material to the 3% luminous flux and further improving the light efficiency. Through calculation, if the front light reflective surface is designed as a concave curved surface or a concave surface composed of multiple planar surfaces, the reflective path thereof is more conducive to uniform light distribution.

In the reflective light source device RS provided by the embodiment of the present disclosure, the rear sidewall 2, the front sidewall 3, the left sidewall 4-1, and the right sidewall 4-2 can be independent or integrated, that is, designed as a whole, or some parts of them can be integrated, while other parts of them are independent. The materials of the rear sidewall, the front sidewall, and the left and right sidewalls can be selected from the group consisting at least one of metal material, plastic (coated with a metal light reflective film), light reflective plastic, light reflective film or light reflective coating. In the case where some parts are integrated, for example, as illustrated in FIG. 1 to FIG. 5, where the front sidewall and the left and right sidewalls are integrated, the intersection of sidewalls is smoother, which can improve the uniformity of light distribution and facilitate production and assembly. In the reflective light source device RS provided by the embodiment of the present disclosure, a rectangular or square light outlet, that is, the second opening V2 of the reflective chamber C, is delimited by the rear sidewall, the front sidewall, and the left and right sidewalls.

Figure 8:
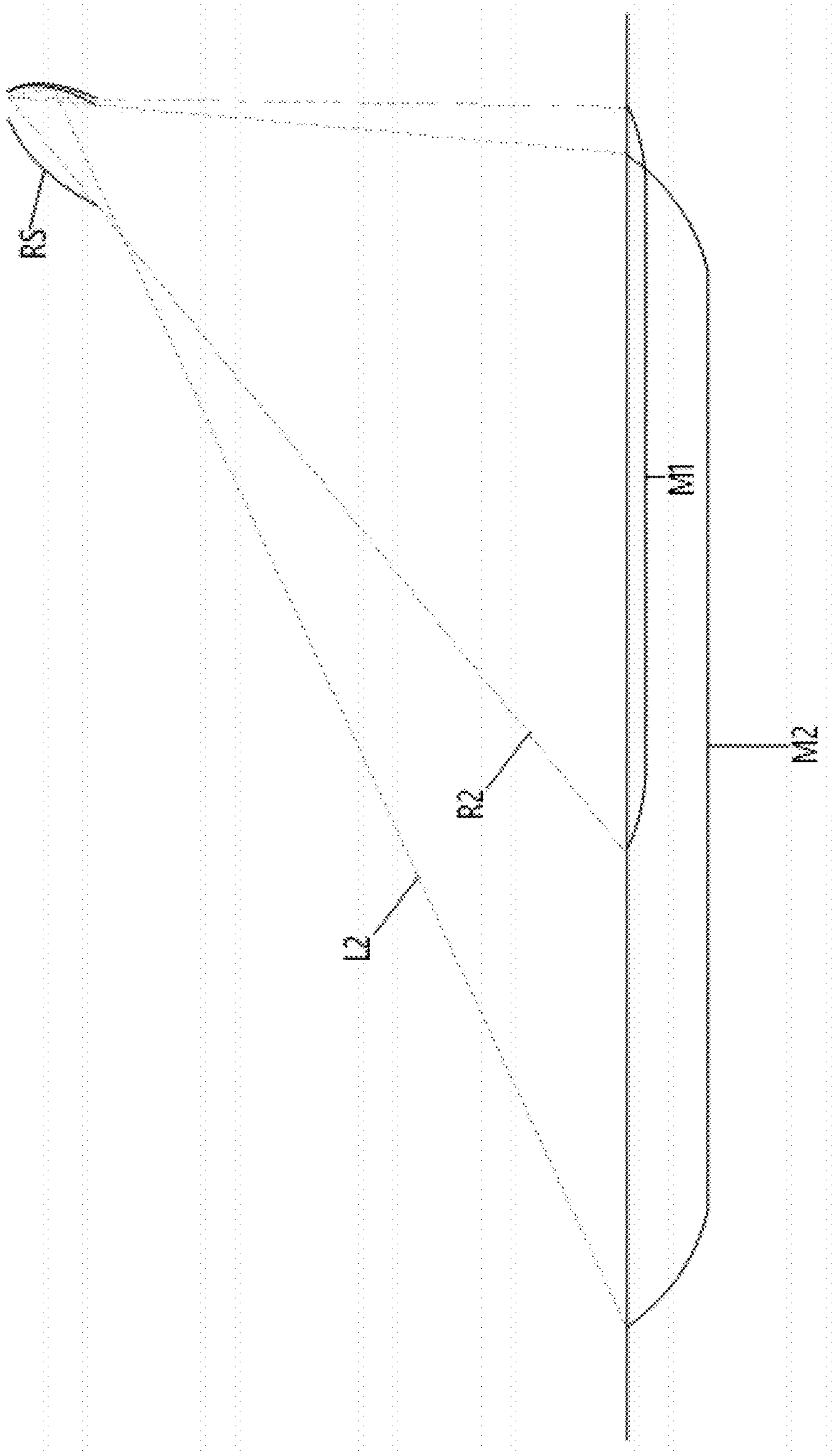
FIG. 8 is a schematic diagram of a reflective light source device provided by an embodiment of the present disclosure forming a first illumination region and a second illumination region on a reference plane.

For example, in the reflective light source device RS provided by the embodiment of the present disclosure, the light source assembly S is arranged at the top of the light reflection assembly, and the LED element 1 is located in a strip-shaped region along the rear light reflective surface. The light source can be a single row or a plurality of rows of strip-shaped dot matrix arranged by a plurality of point light sources. The long sides of the strip-shaped region are located at or near the rear light reflective surface, and the short sides of the strip-shaped region are located at or near the left and right light reflective surfaces. In the present embodiment, the LED elements 1 are a strip-shaped dot matrix composed of two rows of LEDs, as illustrated in FIG. 1 and FIG. 8.

In the reflective light source device RS provided by the embodiment of the present disclosure, the light-emitting angle of the LED element 1 is, for example, between 100 degrees and 160 degrees, and the strongest part of the light emitted from the LED element 1 is right in front of the light source. The LED element 1 in the reflective light source device RS provided by the embodiment of the present disclosure is arranged at the top and illuminates downwards, so in the reflective chamber C, the strongest part of the light is directly below the LED element 1.

Here, the first cross section is coplanar with the first reference straight line R1 and is intersected with the rear sidewall 2 and the front sidewall 3. Referring to FIG. 4, on the first cross section, the inner surface (i.e., the rear light reflective surface) of the rear sidewall 2 facing the reflective chamber C has a first end point E1 on the reference plane P1 and a second end point E2 opposite to the first end point E1; and the inner surface of the second sidewall 3 facing the reflective chamber C (i.e., the front light reflective surface/front light blocking surface) has a third end point E3 on the reference plane P1 and a fourth end point E4 opposite to the third end point E3.

On the first cross section, the length of the first straight line segment connecting the first end point E1 and the second end point E2 of the inner surface of the rear sidewall 2 is less than the length of the second straight line segment connecting the third end point E3 and the fourth end point E4 of the inner surface of the front sidewall 3. For example, the length of the first straight line segment is less than the length of the second straight line segment. It should be noted that the first straight line segment and the second straight line segment here are virtual reference straight line segments (illustrated by dashed lines in FIG. 4 and FIG. 5), which are used to describe the position and size relationship of related components.

For example, the included angle between the first straight line segment and a part of the first reference plane P1 overlapping with the first opening V1 is a first included angle $\alpha$1. The included angle between the second straight line segment and the part of the first reference plane P1 overlapping with the first opening V1 is a second included angle $\alpha$2. The first included angle $\alpha$1 is smaller than the second included angle $\alpha$2.

For example, the first included angle is greater than or equal to 30 degrees and less than or equal to 120 degrees.

For example, a difference between the second included angle and the first included angle is greater than or equal to 20 degrees.

On the first cross section, the orthographic projection of the second end point E2 of the rear sidewall 2 on a reference plane RP perpendicular to the light-emitting centerline direction is closer to the orthographic projection of the effective light-emitting portion of the light source assembly S on the reference plane than the orthographic projection of the fourth end point E4 of the front sidewall 3 on the reference plane RP. For example, in FIG. 4, the orthographic projection of the second end point E2 of the rear sidewall 2 on the reference plane RP overlaps with the edge, away from the rear sidewall, of the orthographic projection of the effective light-emitting portion of the light source assembly on the reference plane RP, while the orthographic projection of the fourth end point E4 of the front sidewall 3 on the reference plane RP is located at a far position at the front side beyond the orthographic projection of the effective light-emitting portion of the light source assembly on the reference plane RP. In FIG. 4, the rear sidewall 2 covers an entirety of the effective light-emitting portion of the light source assembly in the light-emitting centerline direction.

It should be noted that the reference plane RP here is a virtual plane, which is used to describe the position and size relationship of the related components of the light reflection assembly and the light source assembly. The reference plane is, for example, parallel to the reference plane P1 and/or the reference plane P2 of the light reflection assembly. Here, the region occupied by the orthographic projection of the effective light-emitting portion of the light source assembly on the reference plane RP can also be referred to as a reference region RA. The reference region RA is a virtual region on a reference plane, and the size and shape thereof are the same as the orthographic projection of the effective light-emitting portion of the light source assembly on the reference plane RP, and the reference region RA completely coincides with the orthographic projection of the effective light-emitting portion of the light source assembly on the reference plane RP.

Here, the effective light-emitting portion of the light source assembly refers to the portion where the light emitted from the light source assembly illuminates before leaving the light source assembly.

In the present embodiment, for example, the rear sidewall 2 is rotated to such a position that it covers only a part of the effective light-emitting portion of the light source assembly in the light-emitting centerline direction. In this case, the orthographic projection of the second end point E2 of the inner surface of the rear sidewall 2 on the reference plane may be located within the reference region RA or on the edge of the reference region RA close to the rear sidewall.

In the present embodiment, for example, the rear sidewall 2 can also be rotated to such a position that it does not cover the effective light-emitting portion of the light source assembly in the light-emitting centerline direction at all. In this case, the orthographic projection of the second end point E2 of the inner surface of the rear sidewall 2 on the reference plane is located at a position at the rear side beyond the reference region.

In the embodiment of the present disclosure, the extent to which the rear sidewall 2 and the front sidewall 3 cover the effective light-emitting portion of the light source assembly in the light-emitting centerline direction is not limited. The asymmetric design that the rear sidewall 2 is closer to a position under the effective light-emitting portion of the light source assembly than the front sidewall 3 can realize the adjustment of the direction in which the light emitted by the light source assembly exits from the reflective chamber, so that the illuminated region has higher brightness uniformity.

As illustrated in FIG. 1 to FIG. 5, in the reflective light source device RS provided by the embodiment of the present disclosure, the included angle between the rear sidewall 2 and the light-emitting centerline direction of the light source assembly can be adjusted by an angle adjusting member.

Referring to FIG. 1 to FIG. 5, the angle adjusting member may include a rotating shaft or hinge 5 and a clamping slot 6. The rear sidewall 2 rotates around the rotating shaft or hinge 5 close to an end of the LED element 1, and the position of the rear sidewall 2 is fixed by the clamping slot 6 provided at an end of the second opening V2 (i.e., the light outlet). The clamping slot 6 can be provided with a plurality of slot positions. When the rear sidewall 2 rotates to a proper position, an end of the rear sidewall 2 close to the light outlet V2 will slide into a slot position in the clamping slot, so that the included angle between the rear sidewall 2 and the light-emitting centerline direction of the light source assembly is determined. By adjusting the included angle between the rear sidewall 2 and the light-emitting centerline direction of the light source assembly, the reflection angle and the reflection path of the rear light reflective surface against the light beams emitted from the light source can be adjusted.

The angle adjusting member can also be applied to adjust the included angle between the left sidewall, the right sidewall, or the front sidewall and the light-emitting centerline direction of the light source assembly. For example, the included angles between any two or more of the rear sidewall, the left and right sidewalls, and the front sidewall and the light-emitting centerline direction of the light source assembly can be respectively adjusted by the angle adjusting member.

In another exemplary embodiment, the angle adjusting member may also include, but is not limited to, adjusting and fixing the included angle by a gear instead of a clamping slot, or controlling the rotation and positioning of each sidewall by a motor. The advantage of the application of the motor is that the adjustment can be changed from manual to automatic, and it can even be changed into remote control in combination with a remote controller. The adjustment of the included angle between each sidewall and the light-emitting centerline direction of the light source assembly can also be realized by combining the above mentioned methods. This design that the reflection angle and the reflection path of at least one sidewall against the light emitted from the light source can increase the universality of the lamp, thereby reducing the production and stocking costs of lamp manufacturers and distributors, and shortening the delivery time.

In another embodiment, the relative positions of the sidewalls of the light reflection assembly are fixed, and for example, four sidewalls are integrally formed; and the light source assembly S is, for example, rotatably installed near the first opening V1. In this way, the adjustment of the included angle between each sidewall and the light-emitting centerline direction of the light source assembly can also be realized. The adjustment manner of the included angle is not limited in the embodiment of the present disclosure.

In one example of the embodiment of the present disclosure, the first sidewall 2 is configured to be capable of covering at least a part of the effective light-emitting portion of the light source assembly S in the light-emitting centerline direction, and the second sidewall 3 is configured not to cover the effective light-emitting portion of the light source assembly S in the light-emitting centerline direction at all. In this way, the glare generated by the light from the light-emitting element emitted to backward and directly downward can be better cut off, and an illumination region with higher brightness uniformity can be obtained.

For example, the first sidewall 2 may be configured to rotate between a first position and a second position.

Figure 6:
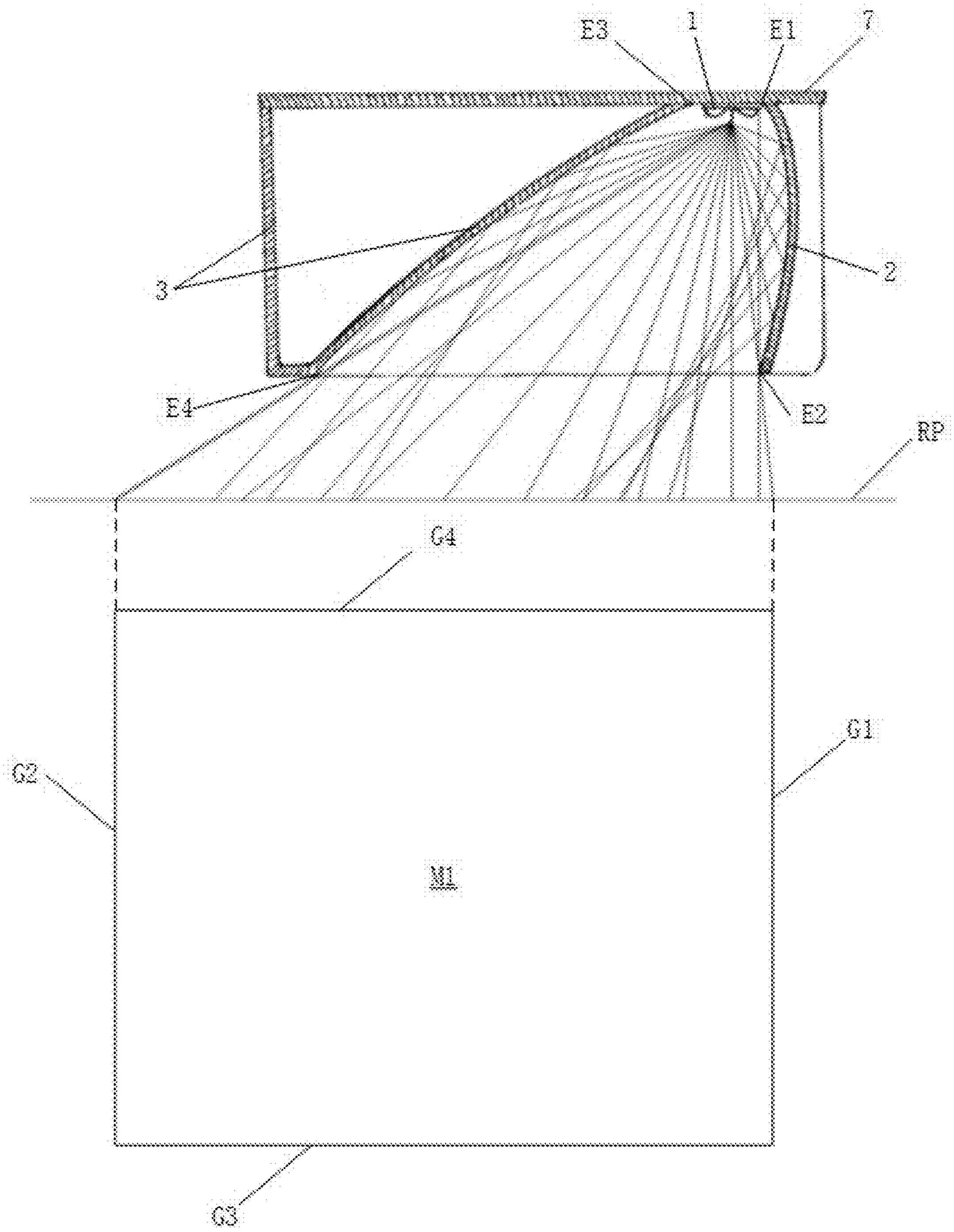
FIG. 6 illustrates a partial optical path diagram in which a light beam from a light source assembly is reflected by a light reflection assembly to the reference plane to form a first illumination region, an upper part of FIG. 6 is a schematic structural cross-sectional view of a rear sidewall of a reflective light source device provided by an embodiment of the present disclosure at a first position, and a lower part of FIG. 6 is a schematic plan view of a first illumination region on a reference plane.
Figure 7:
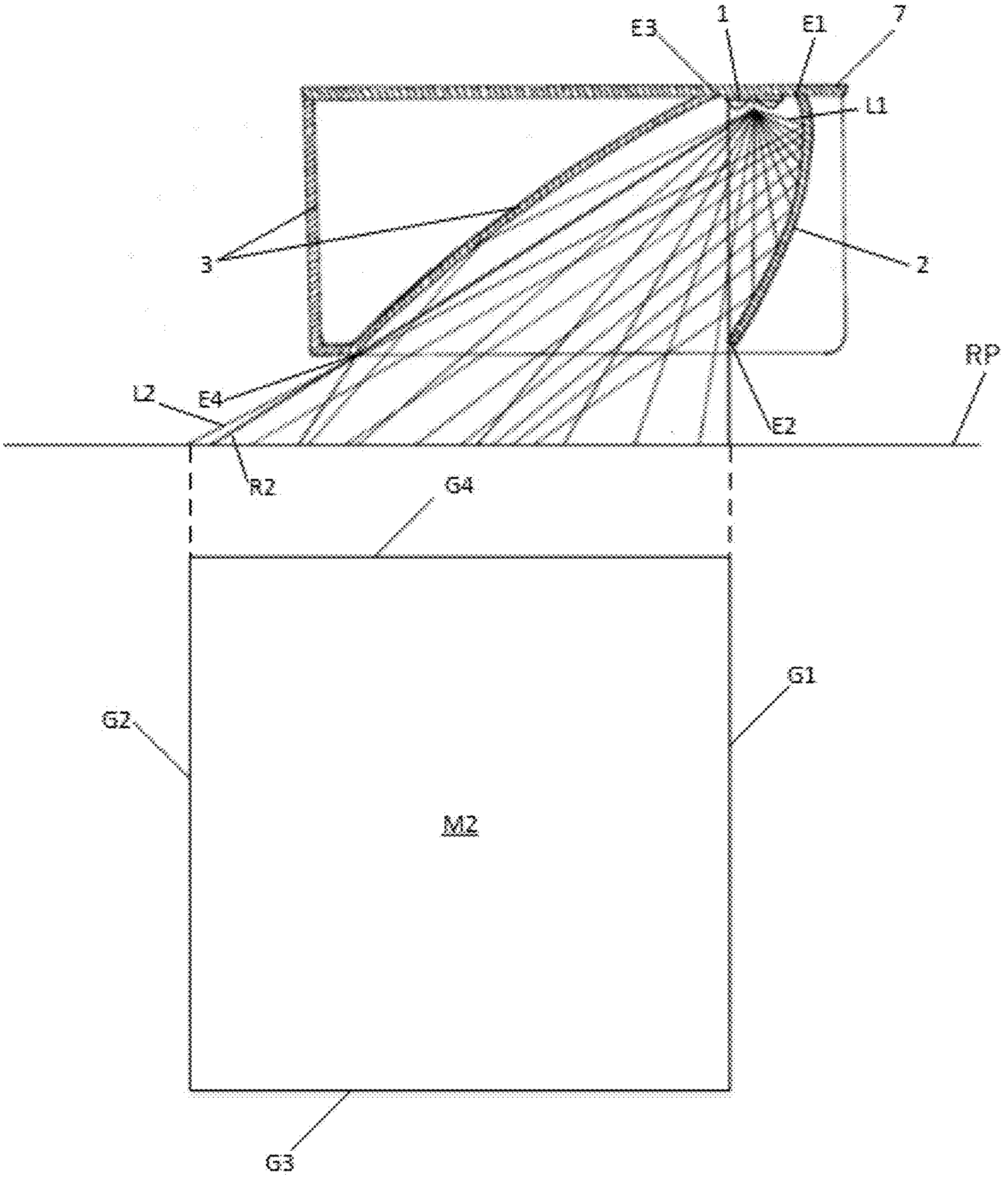
FIG. 7 illustrates a partial optical path diagram in which a light beam from a light source assembly is reflected by a light reflection assembly to the reference plane to form a second illumination region, an upper part of FIG. 7 is a schematic structural cross-sectional view of a rear sidewall of a reflective light source device provided by an embodiment of the present disclosure at a second position, a lower part of FIG. 7 is a schematic plan view of a second illumination region on a reference plane.

In FIG. 6, the upper part of FIG. 6 is a schematic cross-sectional diagram of the rear sidewall of the reflective light source device RS provided by the embodiment of the present disclosure at the first position, the lower part of FIG. 6 is a plan view of the first illumination region on the reference plane RP, and a partial optical path diagram in which the light beam from the light source assembly is reflected by the light reflection assembly to the reference plane to form the first illumination region is illustrated. In FIG. 7, the upper part of FIG. 7 is a schematic cross-sectional diagram of the rear sidewall of the reflective light source device RS provided by the embodiment of the present disclosure at the second position, the lower part of FIG. 7 is a plan view of the second illumination region on the reference plane, and a partial optical path diagram in which the light beam from the light source assembly is reflected by the light reflection assembly to the reference plane to form the second illumination region is illustrated.

In FIG. 6 and FIG. 7, for clarity and simplicity of the diagrams, one light-emitting point of the effective light-emitting portion of the LED element 1 is illustrated directly below the LED element 1, thus illustrating the optical path of the light beam emitted from the light-emitting point.

Referring to FIG. 6, on the first cross section, the second end point E2 of the rear sidewall 2 overlaps with the edge, closest to the first end point E1, of the effective light-emitting portion of the LED element 1 in the light-emitting centerline direction in the case where the straight line segment connecting the second end point E2 of the rear sidewall 2 and the fourth end point E4 of the front sidewall 3 is parallel to the reference plane P1. In this way, not only can the glare generated by the light emitted backward from the light-emitting element be effectively cut off, but also the probability that the light is reflected to the front sidewall via the rear sidewall can be effectively reduced, thereby further improving the utilization rate of the light. Here, the relationship between the straight line segment connecting the second end point E2 of the rear sidewall 2 and the fourth end point E4 of the front sidewall 3 and the reference plane P1 is not limited. In another embodiment, the straight line segment connecting the second end point E2 of the rear sidewall 2 and the fourth end point E4 of the front sidewall 3 may not be parallel to the reference plane P1.

Referring to FIG. 6, in the case where the rear sidewall 2 is at the first position, the second end point E2 of the rear sidewall 2 overlaps with the edge, closest to the first end point E1, of the effective light-emitting portion of the LED element 1 in the light-emitting centerline direction of the light source assembly S. By using the rear light reflective surface 2, the light with high light intensity emitted from the LED element 1 is reflected by the rear light reflective surface to change its path, so that it will be emitted forward, making the emitted light more uniform. In addition, most of the light beams emitted directly backward are blocked by the rear sidewall, thus cutting off the possible glare.

Referring to FIG. 7, in the case where the rear sidewall 2 is at the second position, the second end point E2 of the rear sidewall 2 overlaps with the edge, farthest away from the rear sidewall 2, of the effective light-emitting portion of the LED element 1 in the light-emitting centerline direction of the light source assembly S. In this case, the rear sidewall 2 completely covers the effective light-emitting portion of the LED element 1 in the light-emitting centerline direction. Compared with the case where the rear sidewall 2 is at the first position as illustrated in FIG. 6, in the case where the rear sidewall 2 is at the second position, the light with high light intensity emitted directly downward from the LED element 1 will be reflected more by the rear light reflective surface to change its path, so that it will be emitted forward, making the emitted light more uniform. In addition, most of the light beams emitted directly backward and directly downward are blocked by the rear sidewall, thus cutting off the possible glare.

Referring to FIG. 6, after the light from the LED element 1 exits from the reflective chamber C, a first illumination region M1 is formed on the reference plane RP. Referring to FIG. 7, after the light from the LED element 1 exits from the reflective chamber C, a second illumination region M2 is formed on the reference plane RP. Each of the first illumination regions M1 and the second illumination M2 has a first edge G1, a second edge G2, a third edge G3, and a fourth edge G4, which are connected to each other. The rear sidewall 2, the front sidewall 3, the left sidewall 4-1, and the right sidewall 4-2 are configured to define the positions of the first edge G1, the second edge G2, the third edge G3, and the fourth edge G4, respectively. In FIG. 6, the first illumination region M1 has, for example, a square shape; and in FIG. 7, the second illumination region M2 has, for example, a rectangular shape. However, in the embodiment of the present disclosure, the specific shapes of the first and second illumination regions M1 and M2 are not limited. For example, the shapes of the first and second illumination regions M1 and M2 can be rectangles with rounded corners, or parallelograms with rounded corners, etc.

For example, the lower end edges of the rear sidewall 2 and the front sidewall 3 have a straight line shape and are parallel to each other.

For example, the lower end edge of the left sidewall 4-1 and the lower end edge of the right sidewall 4-2 both have a straight line shape and are parallel to each other.

In another exemplary embodiment, the first edge G1 and the second edge G2 of the illumination region on the reference plane RP are straight lines parallel to each other, while the third edge G3 and the fourth edge G4 are not parallel to each other.

The illumination region formed by the reflective light source device RS provided by the embodiment of the present disclosure on the reference plane RP has at least one pair of edges parallel to each other, and therefore, it is advantageous to combine a plurality of such light source devices in an array to form a larger illumination region with basically seamless connection and uniform brightness.

With continued reference to FIG. 7, the rear sidewall 2 is configured to reflect a first light beam L1 from a light-emitting point of the light source assembly S into a second light beam L2, and the second light beam L2 is intersected with the second reference straight line R2 at a second intersection point at the outer side of the reflective chamber C. On the first cross section, the second reference straight line R2 is a straight line passing through the light-emitting point and the fourth end point E4 of the front sidewall 3. Here, the second reference straight line R2 is a virtual straight line, which is used to describe the position and size relationship of related components. In FIG. 7, the second intersection point of the second light beam L2 and the second reference straight line R2 is adjacent to the fourth end point E4 of the second sidewall 3. In this case, the rear sidewall 2 can make the second edge G2 of the illumination region located at a more forward position by the second light beam L2, thereby enlarging the range of the illumination region.

Referring to FIG. 8, in another exemplary embodiment, in the case where the rear sidewall 2 is located at the second position, the first light beam L1 from the light-emitting point of the light source assembly S is reflected by the rear sidewall 2 into the second light beam L2, and the second light beam L2 is intersected with the second reference straight line R2 at a position far away from the fourth end point E4 of the front sidewall 3. The reference plane RP in FIG. 8 is farther away from the reflective light source device RS than the reference plane RP in FIG. 7. Therefore, the effect that the second illumination region M2 is larger than the corresponding first illumination region M1 due to the intersection of the light beam L2 and the second reference straight line R2 is more obvious. Actually, the reference plane RP can correspond to the ground, and the distance between the reflective light source device RS and the reference plane RP can be further increased. Therefore, in the reflective light source device RS provided by the embodiment of the present disclosure, the range of the illumination region can be effectively controlled by adjusting the position of the rear sidewall 2. It can be understood that the generation of the second light beam L2 is not limited to the case where the rear sidewall 2 is located at the second position. In the case where the rear sidewall 2 is located at other positions, the light beam from the light source can also be reflected into a light beam that is intersected with the second reference straight line at the outer side of the reflective chamber.

For example, in the reflective light source device provided by the embodiment of the present disclosure, the curvature of, the concave curved surface or the concave surface composed of multiple planar surfaces, of the rear light reflective surface, and the included angle between the rear light reflective surface and the front light blocking surface or the front light reflective surface, can be elaborately designed, so as to allow light to be reflected only once on the rear light reflective surface as much as possible, and to prevent the rear light reflective surface from reflecting light to the front light blocking surface, or the front light reflective surface, or the left and right light reflective surfaces as much as possible, thus reducing secondary reflection and further improving the light efficiency. In the reflective light source device provided by the embodiment of the present disclosure, the distance between the left and right light reflective surfaces gradually increases from one end close to the light source to one end of the light outlet of the light reflection assembly, and the included angle between the left and right light reflective surfaces and the curvatures of the left and right light reflective surfaces in the case where they are curved surfaces or curved surfaces composed of multiple planar surfaces, can be elaborately designed, so as to avoid secondary reflection of light between the left and right light reflective surfaces or prevent light from being reflected by the left and right light reflective surfaces to other light reflective surfaces as much as possible, thereby further improving the light efficiency. With this design, the light reflection assembly provided by the embodiment of the present disclosure can improve the light efficiency by about 8%.

Figure 9:
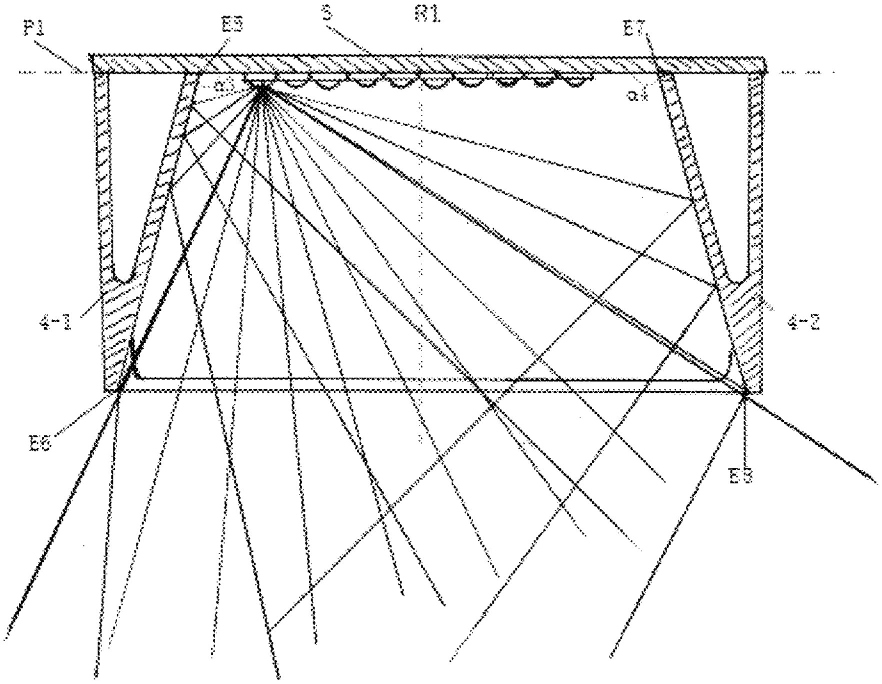
FIG. 9 is a schematic structural view of a reflective light source device provided by an embodiment of the present disclosure on a second cross section.

FIG. 9 is a schematic structural view of a reflective light source device provided by an embodiment of the present disclosure on a second cross section. Here, the second cross section is intersected with the first cross section. For example, the second cross section and the first cross section are perpendicular to each other. Here, the second cross section is coplanar with the first reference straight line R1 and is intersected with the third sidewall 4-1 and the fourth sidewall 4-2.

In the reflective light source device provided by the embodiment of the present disclosure, for example, referring to FIG. 9, at least a part of each of the inner surfaces of the left sidewall 4-1 and the right sidewall 4-2 facing the reflective chamber C is a planar surface.

Referring to FIG. 9, on the second cross section, the inner surface of the left sidewall 4-1 facing the reflective chamber has a fifth end point E5 on the first reference plane P1 and a sixth end point E6 opposite to the fifth end point E5. The inner surface of the right wall 4-2 facing the reflective chamber has a seventh end point E7 on the first reference plane and an eighth end point E8 opposite to the seventh end point E7.

On the second cross section, the included angle between the third straight line segment connecting the fifth end point E5 and the sixth end point E6 of the inner surface of the left sidewall 4-1 and the part of the first reference plane P1 overlapping with the first opening V1 is a third included angle $\alpha$3; and the included angle between the fourth straight line segment connecting the seventh end point E7 and the eighth end point E8 of the inner surface of the right sidewall 4-2 and the part of the first reference plane P1 overlapping with the first opening V1 is a fourth included angle $\alpha$4. It should be noted that the third straight line segment and the fourth straight line segment here are virtual reference straight line segments, which are used to describe the position and size relationship of related components.

For example, at least one of the first angle $\alpha$1, the second angle $\sigma$2, the third angle $\alpha$3, and the fourth angle $\alpha$4 is adjustable.

For example, on the second cross section, the fifth end point E5 is closer to the first reference straight line R1 than the sixth end point E6, and the seventh end point E7 is closer to the first reference straight line R1 than the eighth end point E8.

In the embodiment of the present disclosure, the inner surface of at least one of the rear sidewall 2, the front sidewall 3, the left sidewall 4-1, and the right sidewall 4-2 is a smooth surface as a whole. For example, the inner surface of each of the rear sidewall 2, the front sidewall 3, the left sidewall 4-1, and the right sidewall 4-2 is a smooth surface as a whole. The smooth surface can be a smooth planar surface, a smooth curved surface or a combination thereof. Here, "smooth" refers to that there are no obvious sharp edges and sharp corners.

Referring back to FIG. 3, a part of the inner surface of the front sidewall 3 adjacent to the left sidewall 4-1 and a part of the inner surface of the left sidewall 4-1 adjacent to the front sidewall 3 are both located in a first smooth curved surface Z1; and a part of the inner surface of the front sidewall 3 adjacent to the right sidewall 4-2 and a part of the inner surface of the right sidewall 4-2 adjacent to the front sidewall 3 are both located in a second smooth curved surface Z2. In another exemplary embodiment, the part of the inner surface of the front sidewall 3 adjacent to the left sidewall 4-1 and the part of the inner surface of the left sidewall 4-1 adjacent to the front sidewall 3 are both located in the first smooth curved surface Z1, while the part of the inner surface of the front sidewall 3 adjacent to the right sidewall 4-2 forms an edge at the intersection with the part of the inner surface of the right sidewall 4-2 adjacent to the front sidewall 3. In further another exemplary embodiment, the part of the inner surface of the front sidewall 3 adjacent to the left sidewall 4-1 forms an edge at the intersection with the part of the inner surface of the left sidewall 4-1 adjacent to the front sidewall 3, while the part of the inner surface of the front sidewall 3 adjacent to the right sidewall 4-2 and the part of the inner surface of the right sidewall 4-2 adjacent to the front sidewall 3 are both located in the second smooth curved surface Z2. On a cross section parallel to the first reference plane, the first smooth curved surface Z1 and the second smooth curved surface Z2 are, for example, smooth curved lines. Although the boundaries of the first smooth surface Z1 and the second smooth surface Z2 are illustrated in FIG. 1 to FIG. 3, it does not refer to that there are obvious sharp edges at the boundary positions; and the first smooth curved surface Z1 and the second smooth curved surface Z2 are smoothly connected with the corresponding parts of the inner surfaces of the front sidewall 3, the left sidewall 4-1, and the right sidewall 4-2. In the present embodiment, the first smooth curved surface Z1 and the second smooth curved surface Z2 are used to replace the possible edges at the corresponding boundary positions, which can help to improve the uniformity of the light beams reflected by them and exiting from the reflective chamber.

In the present embodiment, the part of the inner surface of the front sidewall 3 adjacent to the left sidewall 4-1 is directly connected with the part of the inner surface of the left sidewall 4-1 adjacent to the front sidewall 3; and the part of the inner surface of the front sidewall 3 adjacent to the right sidewall 4-2 is directly connected with the part of the inner surface of the right sidewall 4-2 adjacent to the front sidewall 3. The embodiment of the present disclosure is not limited to this case. In another exemplary embodiment, a gap may be provided between the part of the inner surface of the front sidewall 3 adjacent to the left sidewall 4-1 and the part of the inner surface of the left sidewall 4-1 adjacent to the front sidewall 3; and a gap may be provided between the part of the inner surface of the front sidewall 3 adjacent to the right sidewall 4-2 and the part of the inner surface of the right sidewall 4-2 adjacent to the front sidewall 3.

Figure 10:
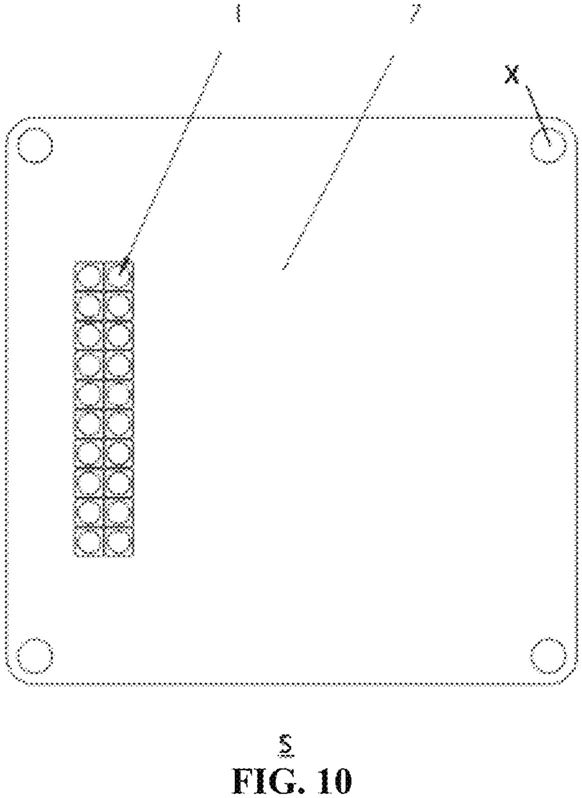
FIG. 10 is a schematic structural plan view of a light source assembly in a reflective light source device provided by an embodiment of the present disclosure.
Figure 11:
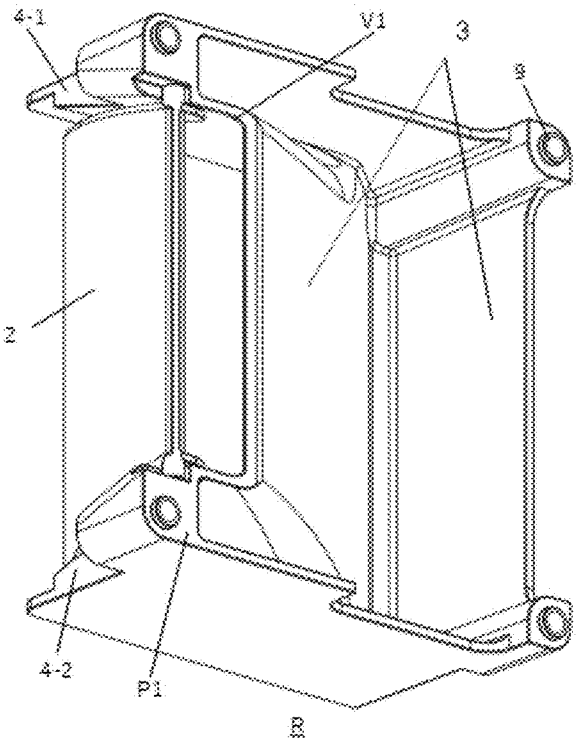
FIG. 11 is a structural perspective view of a light reflection assembly provided by an embodiment of the present disclosure as viewed from top to bottom.

In the reflective light source device RS provided by the embodiment of the present disclosure, the light-emitting element 1 of the light source assembly R can be a discrete LED light source element, such as a light-emitting diode, especially a high-power light-emitting diode, or an integrated LED light source, such as an integrated LED bead, or a COB light source. Referring to FIG. 10 and FIG. 11, in the case where these light-emitting elements are adopted, the light-emitting element 1 is usually mounted on a circuit board 7, and the material of the circuit board can be a copper substrate, an aluminum substrate, an FR-4 epoxide woven glass fabric laminated sheet, or a ceramic substrate, etc. In the case where the light-emitting element 1 is mounted on the circuit board, the top opening V1 of the light reflection assembly R is used to place the light-emitting element 1, and the circuit board is arranged to cover and be located on the opening V1 or is placed in the region of the opening V1. The circuit board 7 can be integrated with the light reflection assembly, and the orientation of the circuit board 7 will change with the orientation change of the light reflection assembly. For example, the circuit board does not exceed the boundary of the horizontal cross section of the light reflection assembly, and will not hinder the seamless splicing and combination of a plurality of individual light reflection assemblies.

For example, at least a part of the outer surface, away from the reflective chamber, of at least one of the rear sidewall, the front sidewall, the left sidewall, and the right sidewall, is planar; and for example, at least a part of the outer surface, away from the reflective chamber, of at least one of the rear sidewall, the front sidewall, the left sidewall, and the right sidewall, is perpendicular to the first reference plane. For example, at least a part of the outer surface, away from the reflective chamber, of the left sidewall, is parallel to at least a part of the outer surface, away from the reflective chamber, of the right sidewall. For example, at least a part of the outer surface, away from the reflective chamber, of the rear sidewall, is parallel to at least a part of the outer surface, away from the reflective chamber, of the front sidewall. For example, at least a part of the outer surface, away from the reflective chamber, of the left sidewall and the right sidewall, is perpendicular to at least a part of the outer surface, away from the reflective chamber, of the rear sidewall and the front sidewall.

The rear sidewall, the front sidewall, and the left and right sidewalls of the light reflection assembly R of the reflective light source device RS provided by the embodiment of the present disclosure jointly forms the main body of the light reflection assembly. To facilitate the installation of the reflective assembly R with the lampshade body, the light reflection assembly provided by the embodiment of the present disclosure may further include a main body positioning hole 8 as illustrated in FIG. 1, so that a screw can pass through the main body positioning hole 8 to fix the reflective light source device on a lampshade body.

The circuit board of the light source assembly S of the reflective light source device RS provided by the embodiment of the present disclosure may further include a circuit board positioning hole X, and the screw can firstly pass through the main body positioning hole 8 and then pass through the circuit board positioning hole X, so as to fix the light reflection assembly R, together with the circuit board 7 and the light-emitting element 1, to the lampshade body. The light reflection assembly R of the reflective light source device RS provided by the embodiment of the present disclosure may further include a positioning bolt 9, as illustrated in FIG. 2 and FIG. 5. The height of the positioning bolt 9 is less than or equal to the thickness of the circuit board 7, and it can be inserted into the circuit board positioning hole X to accurately embed the main body of the light reflection assembly with the circuit board. The positioning bolt 9 may extend from the sidewall, by which the positioning hole 8 is formed, of the main body of the light reflection assembly, and be inserted into the positioning hole 9 of the circuit board.

In the reflective light source device RS provided by the embodiment of the present disclosure, the main body of the light reflection assembly and the circuit board can also be fixed to the lampshade body by means of pins, inserts, clips, or locking pieces.

In the reflective light source device RS provided by the embodiment of the present disclosure, the main body of the light reflection assembly may further have an opening 10 to facilitate the passage of wires or plugs welded on the circuit board. The opening can be on one sidewall portion or a plurality of sidewall portions; and the opening 10 can be a small slot or a large area hollowed out.

The reflective light source device RS provided by another embodiment of the present disclosure may further include a light-transmitting plate 11, such as a glass plate 11, adjacent to the light outlet V2 and covering the light outlet V2, so as to protect the interior structure of the reflective light source device RS from pollution and adverse interference. Here, the specific material of the light-transmitting plate 11 is not limited.

Figure 12:
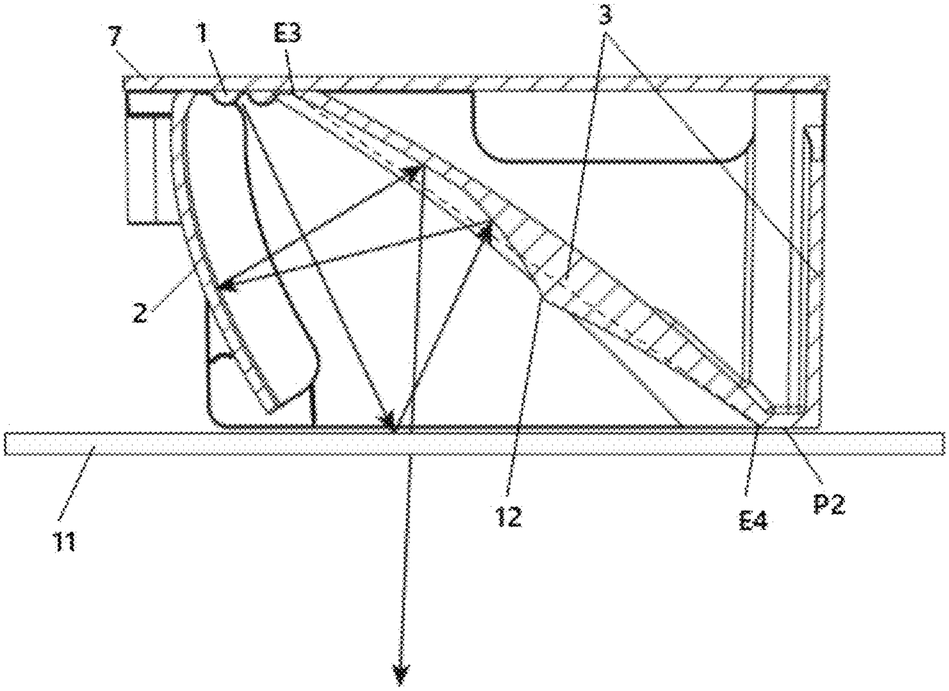
FIG. 12 is a schematic structural view of a reflective light source device provided by another embodiment of the present disclosure on a first cross section, in which a partial optical path of light from a light source assembly is illustrated.

As for the light reflection assembly of the reflective light source device RS illustrated in FIG. 12, except that the shape of the inner surface of the front sidewall 3 facing the reflective chamber C is different and a light-transmitting plate 11 is added, the features of other parts are the same as those of the light reflection assembly R of any of the above embodiments.

In FIG. 12, the inner surface of the front sidewall 3 facing the reflective chamber c has a convex portion 12 protruding toward the reflective chamber C. The convex portion 12 is located between the third end point E3 and the fourth end point E4 of the inner surface of the front sidewall 3.

On the cross section illustrated in FIG. 12, at least a part of the convex portion 12 is located at one side, which is close to the sidewall portion 2, of the second straight line segment between the third end point E3 and the fourth end point E4 of the front sidewall 3. The second straight line segment between the third end point E3 and the fourth end point E4 of the front sidewall 3 is intersected with the convex portion 12. Here, the second straight line segment between the third end point E3 and the fourth end point E4 of the front sidewall 3 is a virtual reference straight line, as illustrated by a dashed line in FIG. 12, which is used to describe the position and size relationship of related components.

The glass plate 11 itself may reflect some light beams to the front light reflective surface, and these reflected light beams are reflected by the front light reflective surface that is provided with a convex portion 12 to have a design of biconcave curved surface, so that the light beams reflected by the glass plate 11 back to the light reflective surface can be reflected again to the region to be illuminated, and the optical path illustrated by the arrow in FIG. 12 can be referred to. For example, each concave surface can be composed of a plurality of repeating units, and the repeating unit can be a polygonal plane or a pit, such as a golf spherical surface or a caterpillar track surface.

Although in the above embodiments, a light source assembly S and a light reflection assembly R are correspondingly mounted to form a reflective light source device RS, it can be understood that the number of combinations of light source assemblies S and light reflection assemblies R are not limited in the embodiments of the present disclosure.

Figure 13:
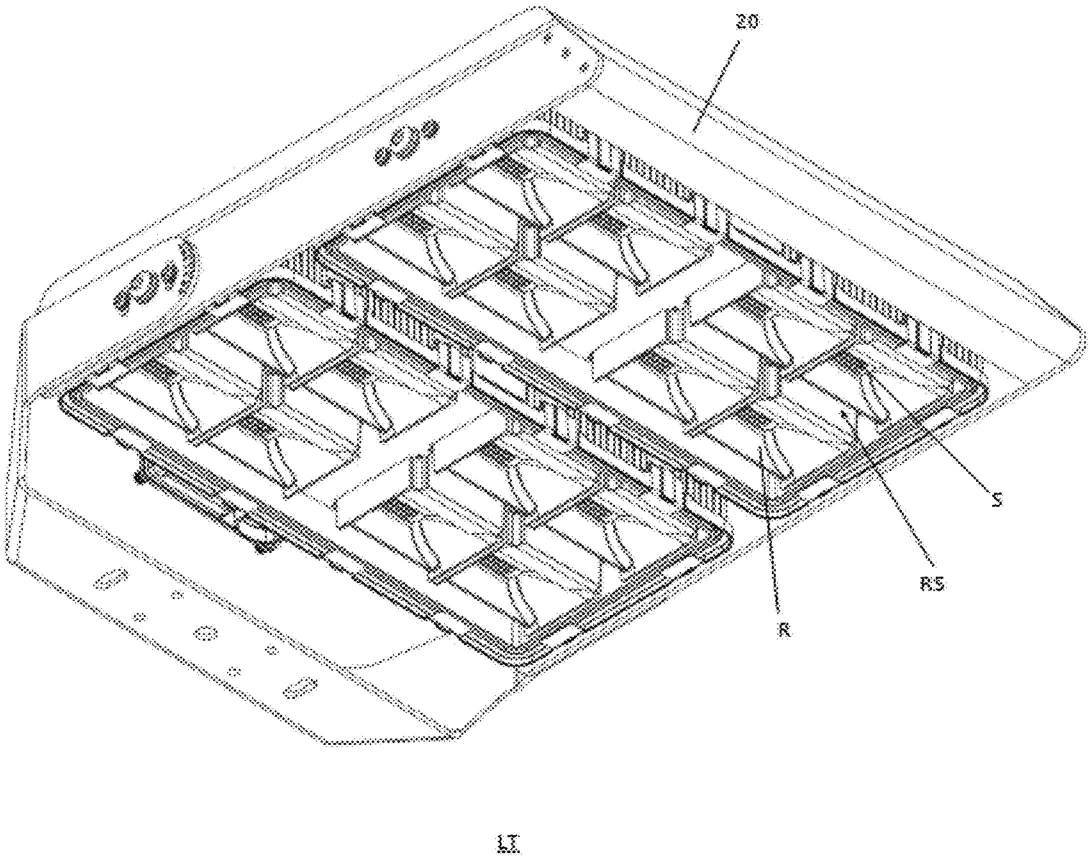
FIG. 13 is a structural perspective view of a lamp provided by an embodiment of the present disclosure.

The embodiment of the present disclosure further provides a lamp LT, as illustrated in FIG. 13, which includes a lampshade body 20 and four reflective light source devices RS mounted onto the lampshade body 20. Here, each reflective light source device RS includes one light source assembly S and four light reflection assemblies R. Each light source assembly S includes a circuit board and four light-emitting elements mounted on the circuit board 7, and the four light reflection assemblies R are in one-to-one correspondence with the four light-emitting elements 1 combined with the circuit board 7.

Each reflective light source device RS can be mounted onto the lampshade body 20, for example, in at least two mounting orientations. For example, referring to FIG. 13, the lampshade body 20 is basically parallel to the ground, and four reflective light source devices RS are mounted on the lampshade body 20 in a first orientation. In this way, the light exiting from the lamp LT is emitted toward the lower front of the lamp LT, and for example, a rectangular illumination region is formed at a position slightly in front of a position directly below the lamp LT. The four reflective light source devices RS can also be mounted on the lampshade body 20 in a second orientation. In this way, the light exiting from the lamp LT is emitted toward the lower left of the lamp LT, and for example, a rectangular illumination region is formed at a position on the left of a position directly below the lamp LT. The four reflective light source devices RS can also be mounted on the lampshade body 20 in a third orientation. In this way, the light exiting from the lamp LT is emitted toward the lower right of the lamp LT, and for example, a rectangular illumination region is formed at a position on the right of a position directly below the lamp LT. In addition, it can be understood that the four reflective light source devices can also be in different mounting orientations. Therefore, under the condition of not changing the installation position of the lampshade body, the lamp LT in the present disclosure can realize accurate regulation and control of the position and range of the illumination region by only adjusting the mounting orientation of the reflective light source device or independently adjusting the rear sidewall of each light reflection assembly.

Because the reflective light source device provided by the embodiment of the present disclosure is designed such that the light source faces downward and the light exiting direction is oblique, the reflective light source device provided by the embodiment of the present disclosure can rotate 360 degrees in the horizontal direction, which makes it possible to adjust the light exiting direction of the reflective light source device, only by horizontally rotating the light reflection assembly or the reflective light source device without changing the mounting orientation of the lampshade body and the lampshade body mounting base, so as to change the light exiting direction of the lamp. In addition, a plurality of individual reflective light source devices can be flexibly spliced and combined into a large reflective light source device which is mounted in a large lampshade body, and each individual reflective light source device can rotate 360 degrees in the horizontal direction, so as to have different light exiting directions. And at the same time, combined with the function of adjusting the reflection angle and reflection path of the light emitted from the light source, the individual reflective light source devices can be adjusted to have different light exiting angles, which makes the light exiting direction and light-emitting angle of the combined large reflective light source device can be flexibly combined, so that the entire lamp can illuminate in any direction around or in all directions around without changing the mounting orientation of the lampshade body and the lampshade body mounting base, and even the light intensity ratio and illumination range in all directions can be arbitrarily modulated to meet a specific overall lighting requirements. Thus, the entire lamp is no longer limited by the lamppost or the installation bracket, which solves the problem of inconvenient installation of commercial floodlights.

The outer surface, away from the reflective chamber, of at least one of the front sidewall, the left sidewall, and the right sidewall of the light reflection assembly provided by the embodiment of the present disclosure, is a planar surface. For example, the outer surface of the light reflection assembly provided by the embodiment of the present disclosure can be rectangular on a horizontal cross section (e.g., a cross section parallel to the reference plane RP), and can even be square, which is more conducive to the seamless splicing of multiple light reflection assemblies into one large light reflection assembly. Especially in the case where the outer surface of the light reflection assembly on the horizontal cross section is designed to be square, the rotation of the light reflection assembly in the horizontal direction (90 degrees each time) will not change the occupation of the light reflection assembly on the lampshade body mounting base, so the mounting position of the light reflection assembly is the same in spite of the light exiting direction the light reflection assembly, which greatly improves the installation compatibility of the light reflection assembly.

The light reflection assembly, the reflective light source device, and the lamp provided by the embodiments of the present disclosure have the following advantages in addition to the above-mentioned advantages.

Firstly, in the case where the rear sidewall is located at the second position, the light source can hardly be directly observed by naked eyes at a position directly under the light-emitting element of the reflective light source device provided by the embodiment of the present disclosure, and the light source is concealed by the rear sidewall. However, the rear sidewall, the left and right sidewalls, and the front sidewall completely enclose the side surface of the light source by 360 degrees, so the light source cannot be observed by naked eyes at a side of a position below the reflection in any direction. Even if the reflective light source device provided by the embodiment of the present disclosure is observed in the illuminated region, the light source cannot be observed at many angles. What enters the eyes is the light of the light source reflected by the light reflective surface. Because the strongest light emitted from the light source will be reflected to a relatively large region by the rear light reflective surface, the intensity of this reflected light is much smaller than the intensity of the light in the case where naked eyes directly observe the light source. Even if the light source can be observed at a certain angle in the illuminated region, naked eyes will not look directly in front of the light source, but only the side surface of the light source is observed, so it is not too dazzling. To sum up, this design avoids the glare caused by the direct exposure of the light source to the field of vision, thus improving the safety and comfort of lighting, and avoiding the occurrence of serious consequences, such as accidents caused by the driver's inability to see the road ahead due to the glare of street lamps, or loss caused by the player's inability to see the position of the football clearly due to the glare of the light on the football field, etc.

Secondly, in the case where the traditional floodlight source is designed to face the illumination region, if the floodlight shines obliquely downward from a high place, the light with the same intensity will be distributed in a relatively small range at a position close to the light source, while the light with the same intensity will be distributed in a relatively large range at a position away from the light source, thus leading to uneven light distribution. However, in the embodiment of the present disclosure, the light source illuminates directly downward, and the light exiting direction is oblique. Thanks to that the rear light reflective surface is elaborately designed to be a concave curved surface or a concave surface composed of multiple planar surfaces, the light incident on the rear light reflective surface will be reflected by the rear light reflective surface and change its path to emit forward, thus being mixed with the light from the light source that directly incident on the front illuminated region without being reflected. Part of the light with the highest intensity emitted from the light source and located in front of the light source is reflected to the far front by the rear light reflective surface, so as to compensate for the light far ahead of the reflective light source device, thus forming a front illumination region with uniform light distribution. Due to the asymmetric design of the rear light reflective surface, and the front light blocking surface or the front light reflective surface relative to the light exiting direction of the light source, the left and right light reflective surfaces intersected with the rear light reflective surface and the front blocking surface or the front light reflective surface will correspondingly reflect the received light to the lateral front, so as to jointly participate in the light distribution of the front illumination region, and further improve the uniformity of the light distribution.

Thirdly, the downward illumination of the light source and the combined application of the rear light reflective surface, the front light blocking surface or the front light reflective surface, and the left and right light reflective surfaces, can effectively cut off the glare that the light source overflows in the upper direction and the surrounding horizontal directions, thus avoiding the light pollution to the surrounding houses caused by that the unwanted or overflowing light is irradiated to the periphery, or avoiding the glow caused by that the light is irradiated toward the sky above, and ensuring that the light is irradiated toward a predetermined target region. Therefore, the light pollution is avoided and the energy is saved.

Fourthly, in the reflective light source device provided by the embodiment of the present disclosure, a rectangular or square light outlet is delimited by the rear light reflective surface, the front light blocking surface or the front light reflective surface, and the left and right light reflective surfaces, and each surface has a blocking effect on light beams; in addition, the included angle between each surface and the light exiting direction of the light source, and/or the curvature of each surface, are precisely designed, and the light source has a strip-shaped dot matrix arrangement, so that the range of light beam of the reflective light source device provided by the embodiment of the present disclosure emitted to the illuminated region (e.g., a designated region on the ground) can be larger than the light beam range of a traditional floodlight and has a rectangular shape with uniform brightness, and the light intensity of any point in the rectangular light beam range will not deviate too far from the average value. Thus, when multiple lamps are spliced for a large-area illumination, both low-brightness gaps and overlapping high-brightness regions are prevented, and therefore, the design and installation of combining multiple lamps for illumination become very simple.

In summary, the light reflection assembly, the reflective light source device, and the lamp provided by the embodiments of the present disclosure solve the problem of uneven light distribution of floodlights to the greatest extent, avoid light overflow, prevent the generation of glare, improve product versatility, simplify installation, and improve light efficiency. The light reflection assembly, the reflective light source device, and the lamp provided by the embodiments of the present disclosure can not only be applied to floodlights, but also be popularized to many fields, such as spotlights, wall washing lights, etc.

What have been described above are only specific implementations of the present disclosure, and the protection scope of the present disclosure is not limited thereto. Therefore, the protection scope of the present disclosure should be determined based on the protection scope of the appended claims.

What is claimed is:

1. A reflective light source device, comprising:

at least one light reflection assembly; and a light source assembly, combined with the at least one light reflection assembly and comprising an effective light-emitting portion, the light reflection assembly comprising:

a sidewall portion, comprising a first sidewall, a second sidewall, a third sidewall, and a fourth sidewall, wherein the first sidewall and the second sidewall are opposite to each other, the third sidewall and the fourth sidewall are opposite to each other, and a reflective chamber is delimited by the first sidewall, the second sidewall, the third sidewall, and the fourth sidewall, and the reflective chamber has a first opening and a second opening at opposite ends;

wherein the first opening is in a first reference plane and is at least partially coplanar with the first reference plane, and a first reference straight line is perpendicularly intersected with the first reference plane at a first intersection point in the first opening, on a first cross section of the light reflection assembly, which is coplanar with the first reference straight line and is intersected with the first sidewall and the second sidewall, an inner surface of the first sidewall facing the reflective chamber has a first end point on the first reference plane and a second end point opposite to the first end point, and an inner surface of the second sidewall facing the reflective chamber has a third end point on the first reference plane and a fourth end point opposite to the third end point, an included angle between a first straight line segment connecting the first end point and the second end point and a part of the first reference plane overlapping with the first opening is a first included angle, an included angle between a second straight line segment connecting the third end point and the fourth end point and the part of the first reference plane overlapping with the first opening is a second included angle, and the first included angle is smaller than the second included angle, and the first included angle faces the second included angle, wherein the inner surface of the second sidewall has at least one convex portion protruding toward the reflective chamber, wherein on the first cross section, a part of the convex portion is located at a side of the second straight line segment facing the first sidewall and goes beyond the second straight line segment so that two parts of the second sidewall are located on both sides of the second straight line segment, respectively, wherein a light-emitting centerline direction of the light source assembly is same as an extending direction of the first reference straight line, and the first reference straight line is intersected with the effective light-emitting portion of the light source assembly.

2. The reflective light source device according to claim 1, wherein the first included angle is in a range from 30 degrees to 120 degrees, and a difference between the second included angle and the first included angle is greater than or equal to 20 degrees.

3. The reflective light source device according to claim 1, wherein both the first included angle and the second included angle are located on a same side of the first reference plane, and both the first included angle and the second included angle are located between the first straight line segment and the second straight line segment.

4. The reflective light source device according to claim 1, wherein the first sidewall is intersected with the first reference straight line, an orthographic projection of the first opening on a plane where the second opening is located falls within an orthographic projection of the first sidewall on the plane where the second opening is located.

5. The reflective light source device according to claim 1, wherein on a second cross section of the light reflection assembly, which is coplanar with the first reference straight line and is intersected with the third sidewall and the fourth sidewall, an inner surface of the third sidewall facing the reflective chamber has a fifth end point on the first reference plane and a sixth end point opposite to the fifth end point, and an inner surface of the fourth sidewall facing the reflective chamber has a seventh end point on the first reference plane and an eighth end point opposite to the seventh end point, an included angle between a third straight line segment connecting the fifth end point and the sixth end point and the part of the first reference plane overlapping with the first opening is a third included angle, and an included angle between a fourth straight line segment connecting the seventh end point and the eighth end point and the part of the first reference plane overlapping with the first opening is a fourth included angle, wherein at least one selected from the group consisting of the first included angle, the second included angle, the third included angle, and the fourth included angle is adjustable.

6. The reflective light source device according to claim 1, wherein on a second cross section of the light reflection assembly, which is coplanar with the first reference straight line and is intersected with the third sidewall and the fourth sidewall, an inner surface of the third sidewall facing the reflective chamber has a fifth end point on the first reference plane and a sixth end point opposite to the fifth end point, and an inner surface of the fourth sidewall facing the reflective chamber has a seventh end point on the first reference plane and an eighth end point opposite to the seventh end point, on the second cross section, the fifth end point is closer to the first reference straight line than the sixth end point, and the seventh end point is closer to the first reference straight line than the eighth end point.

7. The reflective light source device according to claim 1, further comprising a light-transmitting plate adjacent to the second opening and covering the second opening.

8. The reflective light source device according to claim 1, wherein a length of the first straight line segment is less than a length of the second straight line segment.

9. The reflective light source device according to claim 1, wherein the light source assembly comprises a circuit board and at least one light-emitting element mounted on the circuit board, and the at least one light reflection assembly is combined with the circuit board so that the at least one light-emitting element is located in the reflective chamber of the at least one light reflection assembly in one-to-one correspondence.

10. The reflective light source device according to claim 1, wherein a straight line segment connecting the second end point of the first sidewall and the fourth end point of the second sidewall is parallel to the first reference plane, and on the first cross section, the second end point of the first sidewall overlaps with an edge part of the effective light-emitting portion closest to the first end point in an extending direction of the first reference straight line.

11. The reflective light source device according to claim 1, wherein light emitted from the light source assembly forms an illumination region on a second reference plane after passing through the reflective chamber, the second reference plane is located at a side of the at least one light reflection assembly opposite to the light source assembly, and the illumination region has at least one pair of edges parallel to each other.

12. The reflective light source device according to claim 1, wherein on the first cross section, the first sidewall is configured to reflect a first light beam from a light-emitting point of the light source assembly into a second light beam, and the second light beam is intersected with a reference line at an outer side of the reflective chamber, and the reference line is a straight line passing through the light-emitting point and the fourth end point of the second sidewall.

13. The reflective light source device according to claim 1, wherein the first sidewall of the at least one light reflection assembly and the effective light-emitting portion of the light source assembly are configured to be rotatable relative to each other.

14. A lamp, comprising:

at least one reflective light source device according to claim 1; and a lampshade body, provided with at least one mounting portion to mount the at least one reflective light source device in one-to-one correspondence.

15. The lamp according to claim 14, wherein a plurality of reflective light source devices are provided, a plurality of mounting portions are provided, and the plurality of mounting portions are configured to mount the plurality of reflective light source devices in at least two different orientations so that the plurality of reflective light source devices are configured to emit light towards different directions.

16. The reflective light source device according to claim 1, wherein an orthographic projection of the effective light-emitting portion on a plane where the second opening is located falls within an orthographic projection of the first sidewall on the plane where the second opening is located.

17. A reflective light source device, comprising:

at least one light reflection assembly; and a light source assembly, combined with the at least one light reflection assembly and comprising an effective light-emitting portion, the light reflection assembly comprising:

a sidewall portion, comprising a first sidewall, a second sidewall, a third sidewall, and a fourth sidewall, wherein the first sidewall and the second sidewall are opposite to each other, the third sidewall and the fourth sidewall are opposite to each other, and a reflective chamber is delimited by the first sidewall, the second sidewall, the third sidewall, and the fourth sidewall, and the reflective chamber has a first opening and a second opening at opposite ends;

wherein a length of the first sidewall is less than that of the second sidewall, and an orthographic projection of the first opening on a plane where the second opening is located falls within an orthographic projection of the first sidewall on the plane where the second opening is located, wherein the first opening is in a first reference plane and is at least partially coplanar with the first reference plane, and a first reference straight line is perpendicularly intersected with the first reference plane at a first intersection point in the first opening, on a first cross section of the light reflection assembly, which is coplanar with the first reference straight line and is intersected with the first sidewall and the second sidewall, an inner surface of the first sidewall facing the reflective chamber has a first end point on the first reference plane and a second end point opposite to the first end point, and an inner surface of the second sidewall facing the reflective chamber has a third end point on the first reference plane and a fourth end point opposite to the third end point, wherein the inner surface of the second sidewall has at least one convex portion protruding toward the reflective chamber, wherein on the first cross section, a part of the convex portion is located at a side of a second straight line segment connecting the third end point and the fourth end point facing the first sidewall and goes beyond the second straight line segment so that two parts of the second sidewall are located on both sides of the second straight line segment, respectively, wherein a light-emitting centerline direction of the light source assembly is same as an extending direction of the first reference straight line, and the first reference straight line is intersected with the effective light-emitting portion of the light source assembly.

18. A reflective light source device, comprising:

at least one light reflection assembly; and a light source assembly, combined with the at least one light reflection assembly and comprising an effective light-emitting portion, the light reflection assembly comprising:

at least one light reflection assembly; and a light source assembly, combined with the at least one light reflection assembly and comprising an effective light-emitting portion, wherein the light reflection assembly comprises:

a sidewall portion, comprising a first sidewall, a second sidewall, a third sidewall, and a fourth sidewall, wherein the first sidewall and the second sidewall are opposite to each other, the third sidewall and the fourth sidewall are opposite to each other, and a reflective chamber is delimited by the first sidewall, the second sidewall, the third sidewall, and the fourth sidewall, and the reflective chamber has a first opening and a second opening at opposite ends;

wherein an orthographic projection of the effective light-emitting portion on a plane where the second opening is located falls within an orthographic projection of the first sidewall on the plane where the second opening is located, wherein the first opening is in a first reference plane and is at least partially coplanar with the first reference plane, and a first reference straight line is perpendicularly intersected with the first reference plane at a first intersection point in the first opening, on a first cross section of the light reflection assembly, which is coplanar with the first reference straight line and is intersected with the first sidewall and the second sidewall, an inner surface of the first sidewall facing the reflective chamber has a first end point on the first reference plane and a second end point opposite to the first end point, and an inner surface of the second sidewall facing the reflective chamber has a third end point on the first reference plane and a fourth end point opposite to the third end point, wherein the inner surface of the second sidewall has at least one convex portion protruding toward the reflective chamber, wherein on the first cross section, a part of the convex portion is located at a side of a second straight line segment connecting the third end point and the fourth end point facing the first sidewall and goes beyond the second straight line segment so that two parts of the second sidewall are located on both sides of the second straight line segment, respectively, wherein a light-emitting centerline direction of the light source assembly is same as an extending direction of the first reference straight line, and the first reference straight line is intersected with the effective light-emitting portion of the light source assembly.

* * * * *